United States Patent [19]

Umemoto et al.

[11] Patent Number: 5,379,338

[45] Date of Patent: Jan. 3, 1995

[54] RADIOTELEPHONE WITH HANDSET TALKING FUNCTION AND HAND-FREE TALKING FUNCTION

[75] Inventors: Yuji Umemoto; Koichi Ito; Koki Otsuka, all of Tokyo, Japan

[73] Assignee: Kabushiki Kaisha Toshiba, Kawasaki, Japan

[21] Appl. No.: 955,263

[22] Filed: Oct. 1, 1992

[30] Foreign Application Priority Data

Oct. 3, 1991 [JP] Japan ................... 3-256466

[51] Int. Cl.$^6$ .......................................... H04M 11/00
[52] U.S. Cl. ...................... 379/58; 379/420
[58] Field of Search ............... 379/56, 58, 61, 67, 379/88, 388, 420, 434, 59, 410, 406; 455/68, 70

[56] References Cited

U.S. PATENT DOCUMENTS

| 5,014,294 | 5/1991 | Kromeraker et al. | 379/58 |
| 5,148,471 | 9/1992 | Metroka et al. | 379/58 |
| 5,224,151 | 6/1993 | Bowen et al. | 379/58 |

FOREIGN PATENT DOCUMENTS

| 4157853 | 5/1992 | Japan | 379/58 |

Primary Examiner—Curtis Kuntz
Assistant Examiner—William D. Cumming
Attorney, Agent, or Firm—Banner, Birch, McKie & Beckett

[57] ABSTRACT

A radiotelephone of this invention comprises a sending-speech level varying circuit for varying the level of the sending-speech signal from the microphone and supplying the resulting signal and receiving-speech level varying means for varying the level of the receiving-speech signal demodulated by receiving means and supplying the resulting signal to the speaker, as well as a talking-mode setting section and a gain control circuit. At the talking-mode setting section, either the handset talking mode or the hand-free talking mode is set. At the gain control circuit, the gains of the sending-speech level varying circuit and receiving-speech level varying circuit undergo variable control according to the talking mode set by the talking-mode setting section. The gain control is carried out in such a manner that the gain becomes a first specific value when the handset talking mode has been set, and a second specific value larger than the first value when the hand-free talking mode has been set.

29 Claims, 15 Drawing Sheets

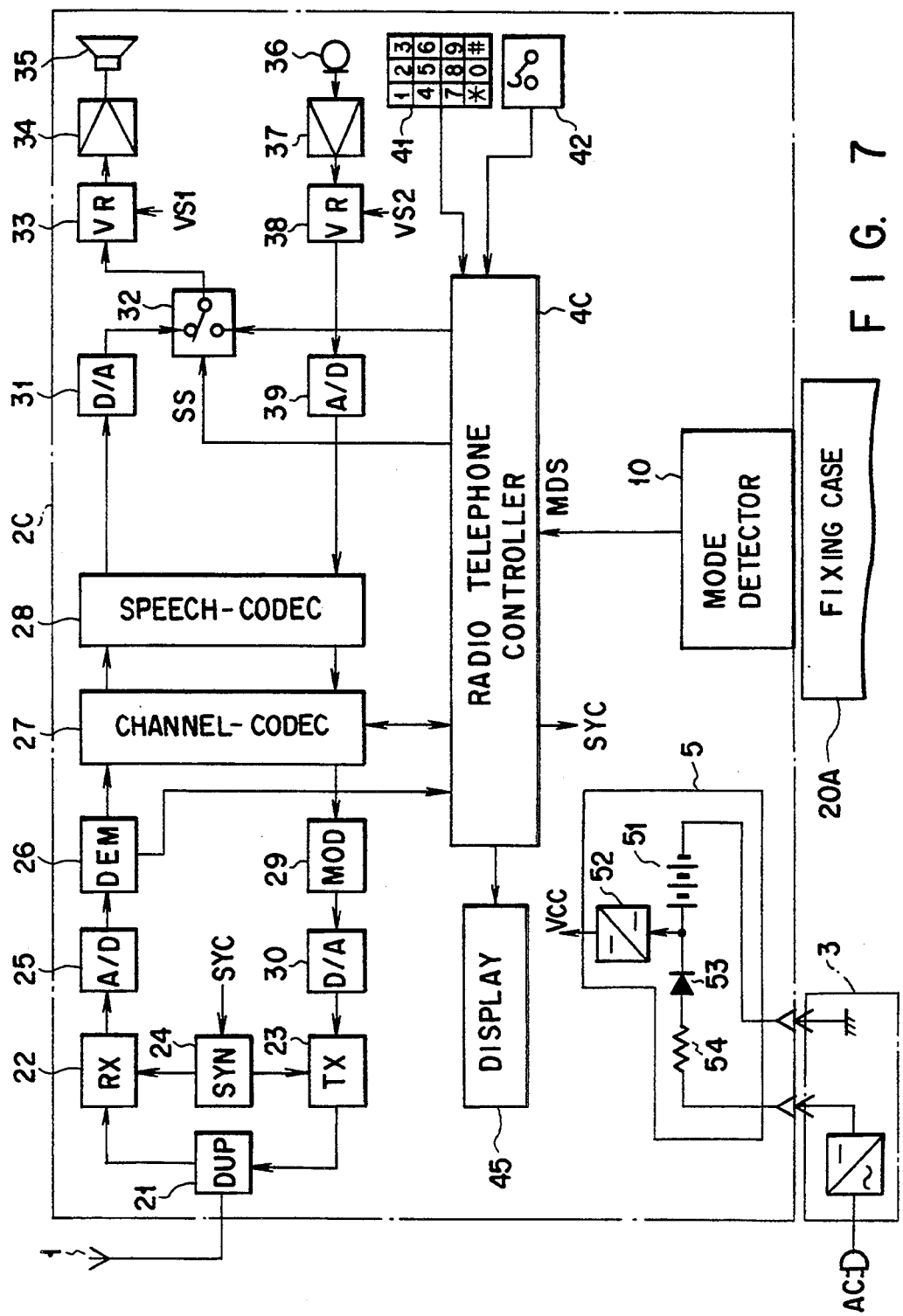
F I G. 7

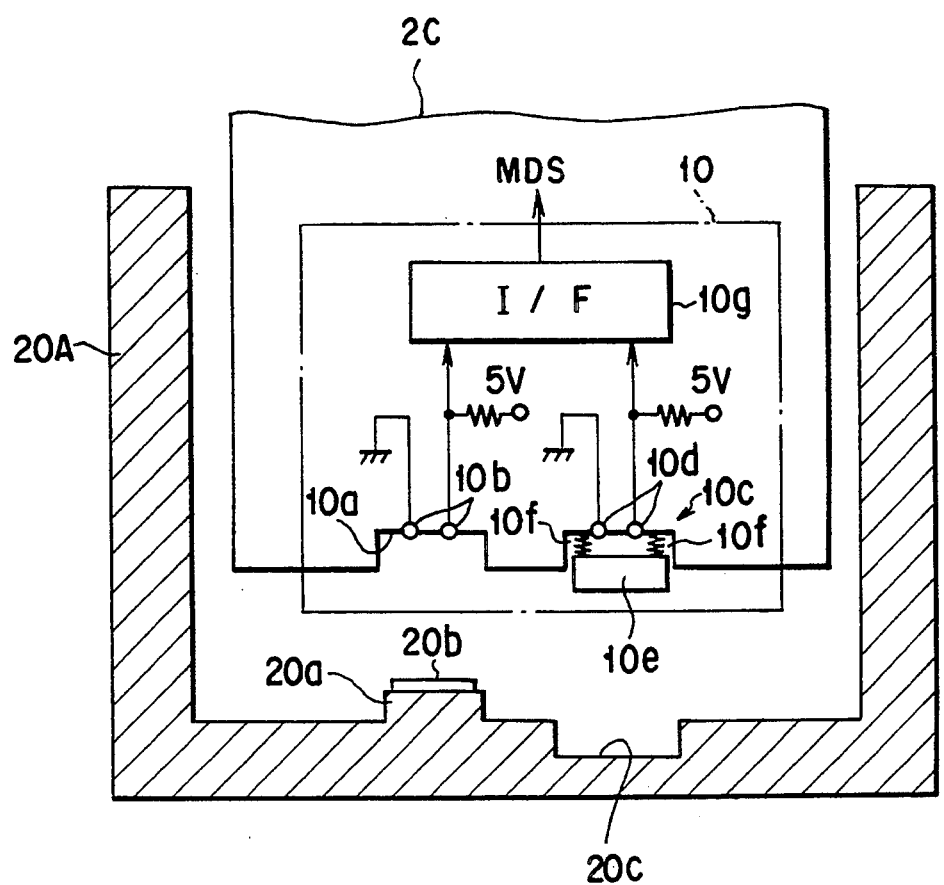
F I G. 8

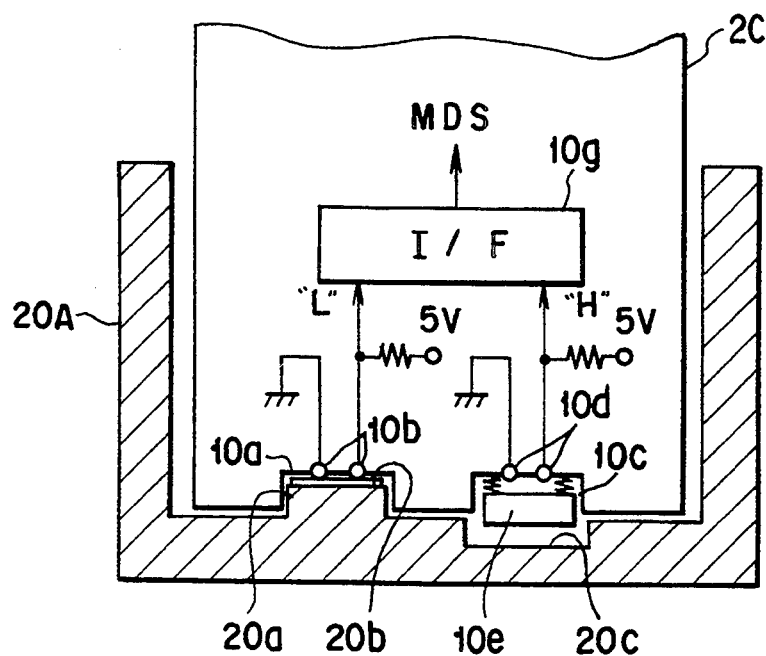
F I G. 9A
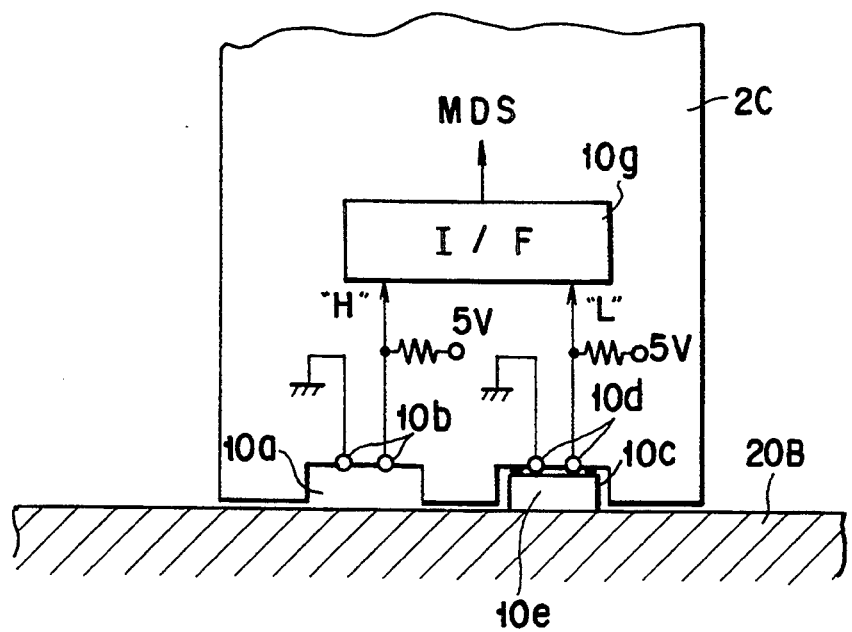
F I G. 9B

RADIOTELEPHONE WITH HANDSET TALKING FUNCTION AND HAND-FREE TALKING FUNCTION

BACKGROUND OF THE INVENTION

1. Field of the Invention

This invention relates to a hand-held radiotelephone for use in a mobile radiotelephone system such as a portable telephone or a cordless telephone system.

2. Description of the Related Art

Among mobile radiotelephone systems available are a cellular-type portable telephone system and a cordless telephone system.

The cellular-type portable telephone system is composed of, for example, a control station CS, a plurality of base stations BS1, BS2 ... and a plurality of portable units PS1, PS2 ... as shown in FIG. 12. The control station CS is connected to a wire telephone network NW via a wire communication channel. The base stations BS1, BS2 ... are connected to the control station CS via wire communication channels CL1, CL2 ... respectively. The base stations BS1, BS2 ... form radio zones E1, E2, ... in different areas, respectively. Each of the portable units PS1, PS2, ... is connected via a radio channel to the base station in the radio zone to which that unit belongs. This circuit further extends from the base station, passes through the control station CS, and is connected to the wire telephone network NW. In this state, it is possible to communicate with another telephone connected to the wire telephone network NW. When a portable unit has moved into another radio zone during conversation, the control station CS switches the radio channel over which conversation is in progress to the radio channel of the base station in the zone into which the unit has moved, which assures the continuity of the conversation.

On the other hand, the cordless telephone system is such that a base unit corresponding to a base station in the portable telephone system is connected to, for example, a subscriber's line terminal in homes or offices, and that a radiotelephone corresponding to a portable unit is connected to the base unit via a radio channel. This cordless telephone system allows communication in as small an area as within a radius of approximately 100 m of the base unit, outside which communication goes off.

Many radiotelephones used in the portable and the cordless telephone system are of the hand-held type. Since this type of radiotelephone enables the speaker to make a call while holding the radiotelephone itself to his mouth and ear like the handset of a wire telephone, he can use it without a sense of incongruity, feeling it very useful.

Conventional radiotelephones of this type, however, generally have only one operation mode, the handset talking mode as noted earlier. For this reason, for example, when the speaker has his hands full because talking over the phone while taking notes, or when more than one speaker wants to join the conversation, he sometimes has to suffer inconvenience.

SUMMARY OF THE INVENTION

A first object of the present invention is to provide an easier-to-use radiotelephone capable of hand-free talking as needed even with the hand-held type.

A second object of the present invention is to provide a radiotelephone capable of automatically setting the talking mode to a desired one without the switch operation by the user.

A third object of the present invention is to provide a radiotelephone capable of easily changing the talking modes as required even during conversation.

A fourth object of the present invention is to provide a radiotelephone system ensuring high-quality hand-free talking.

A fifth object of the present invention is to provide a radiotelephone system capable of not only ensuring high-quality hand-free talking, but also preventing the circuit construction of the radiotelephone from becoming more complex and larger, and from consuming more power.

A sixth object of the present invention is to provide a radiotelephone system capable of suitably causing the echo canceler to operate only when echo canceling is needed.

A seventh object of the present invention is to provide a radiotelephone allowing suitable hand-free talking according to the size of a space in which it is used.

An eighth object of the present invention is to provide a radiotelephone capable of automatic setting of the using space mode to enable the user to operate the telephone more easily and to avoid erroneous setting of the using space mode.

A ninth object of the present invention is to provide a radiotelephone enabling the integral setting of the talking mode and the using space mode by relating them with each other.

To achieve the first object, a radiotelephone of the present invention comprises a sending-speech level varying circuit, which changes the level of the sending speech signal from the microphone and supplies the resulting signal, receiving-speech level varying means, which changes the level of the receiving speech signal demodulated by receiving means and supplies the resulting signal to the speaker, a talking-mode setting section, and a gain control circuit. At the talking-mode setting section, either the handset talking mode or the hand-free talking mode is set. According to the talking mode set at the talking-mode setting section, the gain control circuit performs variable control of the gain of each of the sending-speech level varying circuit and receiving-speech level varying circuit. This gain control is carried out in such a manner that the gain becomes a first specific value when the handset talking mode is set, and a second specific value larger than the first value when the hand-free talking mode is set.

With the present invention, therefore, setting the hand-free talking mode at the talking-mode setting section allows the gain control circuit to set the gains of the sending-speech and receiving-speech level varying circuits to values suitable for the hand-free talking mode. This enables both microphone and speaker to operate for hand-free talking. Thus, in spite of the hand-held radiotelephone, not only handset talking but also hand-free talking is possible. The user, therefore, can speak by telephone even if, for example, his hands are full. It is also possible for more than one speaker to join the conversation. Because the microphone and speaker for handset talking are also usable for hand-free talking, there is no need to prepare an additional microphone and speaker for hand-free talking. This prevents the telephone from becoming larger.

The talking-mode setting section may be constructed in various ways as follows. In a first arrangement, the section contains a manual mode-specifying switch, which is used to set the talking mode to either the handset talking mode or the hand-free talking mode. With this arrangement, it is possible for the user to operate the switch to set the talking mode to a desired one as needed.

In a second arrangement, the section contains a grip sensing section for sensing whether or not the radiotelephone is held in the user's hand, based on whose sense result, the talking mode is set to either the handset talking mode or the hand-free talking mode, with this arrangement, when the user holds the radiotelephone in his hand, it is set to the handset mode, and in the other cases, it is set to the hand-free mode. Because of this, the talking mode can be set to a desired one automatically without the switch operation by the user.

In a third arrangement, the section contains a placement sensing section for sensing whether or not the radiotelephone is put on a placement object, based on whose sense result, the talking mode is set to either the handset talking mode or the hand-free talking mode. With such an arrangement, for example, when the radiotelephone is placed on the desk, the state is sensed by the placement sensing section, which sets the talking mode to the hand-free talking mode. When the radiotelephone is not on the desk, the talking mode is set to the handset talking mode. Consequently, the talking mode is automatically set to a desired one.

In a fourth arrangement, the section contains a connection sensing section for sensing whether or not the radiotelephone is connected to a charging unit, based on whose sense result, the hand-free talking mode is set when the radiotelephone is connected to the charging unit, and the handset talking mode is set when the radiotelephone is not connected to the unit. With this arrangement, for example, when the radiotelephone is put on the charging unit, the talking mode is set to the hand-free talking mode, whereas the talking mode is set to the handset talking mode when the radiotelephone is not placed on the unit. In this case, therefore, the talking mode is automatically set to a desired one.

As described above, use of the second, third, or fourth arrangement enables the achievement of the second object.

A fifth arrangement is such that depending on the number of hook switch operations in making a call, the talking mode is set to either the handset talking mode or the hand-free talking mode, with such an arrangement, the user can set the talking mode to a desired one by operating the hook switch. This makes it unnecessary to provide an additional switch for setting the talking mode, which helps make the radiotelephone design simpler and more compact.

To achieve the third object, a radiotelephone of the present invention monitors the operation of the hook switch during conversation, and when the hook switch is operated for a period of time shorter than a specific period indicating the end of conversation, switches the talking mode to another. This enables the user to easily change one talking mode to the other only by operating the hook switch for a short time, when he wants to change the talking mode from the handset talking mode to the hand-free talking mode, or vice versa.

To attain the fourth object, a radiotelephone system of the present invention is provided with an echo canceler in the sending and receiving speech path including the radiotelephone and base station. This echo canceler erases an echo signal corresponding to an acoustic echo caused at least between the speaker and microphone of the radiotelephone. With the present invention, therefore, even if acoustic echo occurs in hand-free talking, the echo will be canceled, ensuring high-quality speech.

To accomplish the fifth object, a radiotelephone system of the present invention is provided with an echo canceler in the sending and receiving speech path in the base station. This makes the circuit configuration of the radiotelephone simpler and more compact. Further, this configuration helps reduce the power consumption, thereby lengthening the battery's service life.

Further, to accomplish the sixth object, a radiotelephone system of the present invention has an echo canceler control function incorporated in the radiotelephone. With this echo canceler control function, the echo canceler is brought into an operative state when the hand-free talking mode is set, and the echo canceler is placed in an inoperative state when the handset talking mode is set. This makes it possible to cause the echo canceler to operate properly only when echo canceling is needed.

To achieve the seventh object, a radiotelephone of the present invention comprises a talking-mode setting section for setting the talking mode to either the handset talking mode or the hand-free talking mode, and a using space setting section for setting the using space mode to either a first space mode corresponding the space in a car or a second space mode corresponding to a larger volume of space than the in-a-car space. Based on the talking mode set at the talking-mode setting section and the using space mode set at the space-mode setting section, the gain control means performs variable control of the gains of the sending-speech level varying circuit and receiving-speech level varying circuit.

The gain control is carried out as follows. When the handset talking mode is set by the talking-mode setting section, the gain is set at a first specific value. When the hand-free talking mode is set by the talking-mode setting section, and the second space mode is set by the space-mode setting section, the gain is set at a second specific value larger than the first value. In addition, when the hand-free talking mode is set by the talking-mode setting section, and the first space mode is set by the space-mode setting section, the gain is set at a third specific value larger than the first value but smaller than the second value.

With the present invention, the level of sending and receiving speech signals is controlled according to not only the talking mode but also the using space mode. This enables the setting of the optimum sending and receiving speech signal level that makes acoustic echoes or the like less liable to take place in both cases where hand-free talking is done in a relatively small space like the space in a car, and where hand-free taking is done in a relatively large space like the space in a house or in the open air. As a result, it is possible to ensure the optimum hand-free talking according to the size of the using space.

To achieve the eighth object, a radiotelephone of the present invention is provided with a fixing member for detachably fixing the radiotelephone body in a specific place in a car where hand-free talking is possible. The radiotelephone body contains an additional judging section for judging whether or not the body is fixed by the fixing member. When the judging section has judged that the body is fixed by the fixing member, the space mode setting means sets the using space mode to a first space mode corresponding to the space in a car. When the judging section has judged that the body is not secured by the fixing member, the using space mode is set to a second space mode corresponding to a larger volume of space than the in-a-car space.

With the present invention, the using space mode is, therefore, set automatically. This makes it unnecessary for the user to operate the switch or the like to specify the using space mode, which makes it easier for the user to operate the telephone without worrying about erroneous setting of the using space mode.

To accomplish the ninth object, a radiotelephone of the present invention comprises an identifying section for identifying the state of the radiotelephone body, and mode setting means for setting the talking mode and the using space mode depending on the identification result of the identifying section. The identifying section distinguishes three states: a first state in which the radiotelephone body is fastened to the fixing member, a second state in which the body is not fastened to the fixing member but placed on a placement object, and a third state in which the body is neither fixed to the fixing member nor placed on the placement object. The mode setting means sets the handset talking mode when the radiotelephone body is identified as in the third state. When the body is judged to be in the second state, the second using space mode and the hand-free talking mode are set. Further, when the body is judged to be in the first state, the first using space and the hand-free talking mode are set.

With this arrangement, it is possible to achieve integral setting of the talking mode and the using space mode by relating them with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a block diagram showing the construction of a radiotelephone according to a third embodiment of the present invention;

FIG. 8 is a view showing the construction of the mode sensing section of the radiotelephone in FIG. 7.

FIGS. 9A and 9B are explanatory views for the operation of the mode sensing section of FIG. 8;

DETAILED DESCRIPTION OF THE PREFERRED EMBODIMENTS

Referring to the accompanying drawings, embodiments of the present invention will be explained.

A first embodiment is an example of applying the present invention to a digital cordless telephone system.

Figure 1:
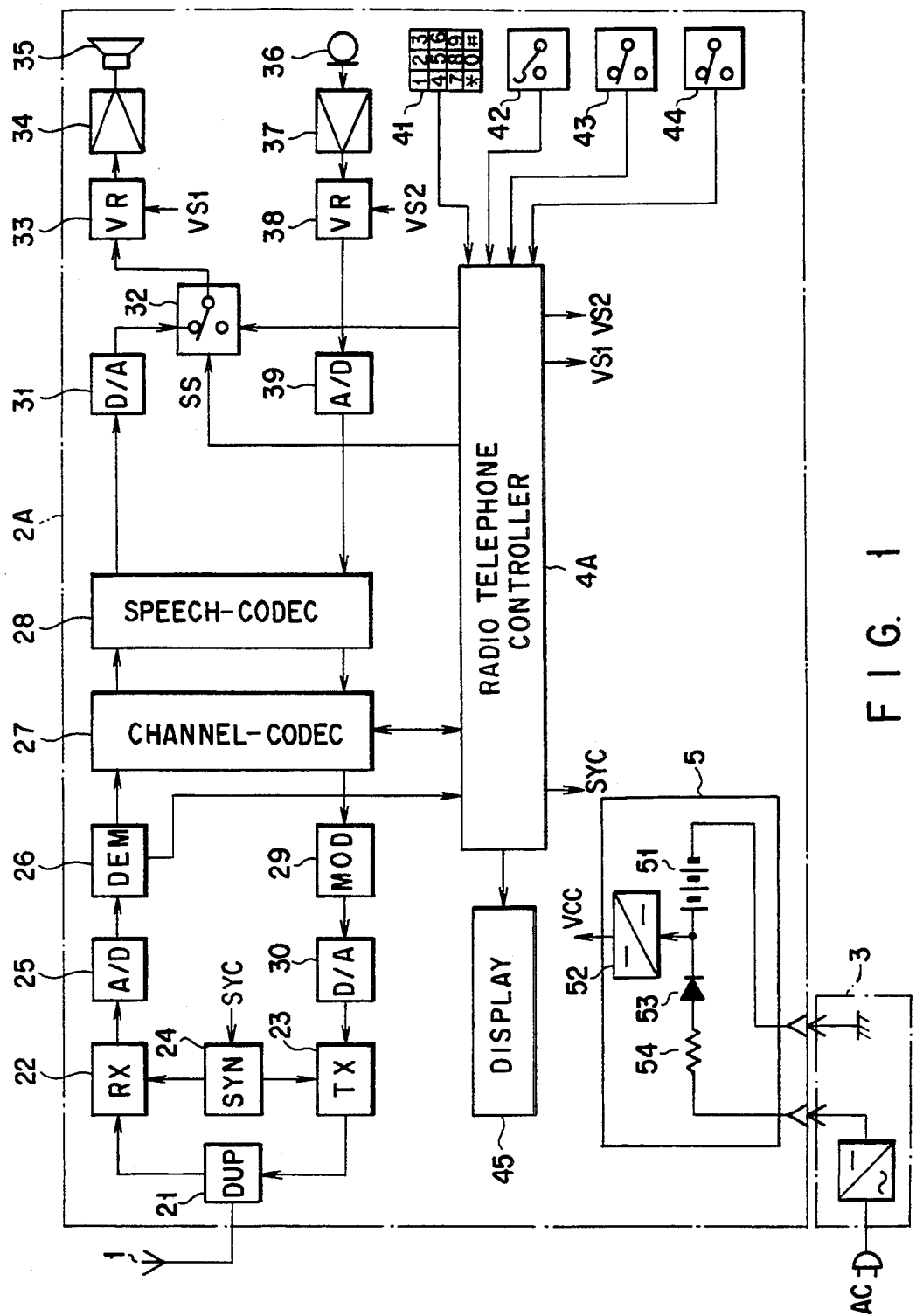
FIG. 1 is a block diagram showing the construction of a radiotelephone of a radiotelephone system according to a first embodiment of the present invention.

FIG. 1 is a block diagram showing the construction of a radiotelephone 2A of a digital cordless telephone system of this embodiment. In the figure, the radio carrier signal coming from a base unit via a specific radio channel is received at an antenna 1, and then supplied to a receiver 22 via a duplexer 21. The receiver 22 mixes the received carrier signal with the receiving local oscillation signal from a frequency synthesizer 24 for frequency conversion into an intermediate frequency signal. The frequency of the receiving local oscillation signal generated at the frequency synthesizer 24 is specified by the control signal SYC from a radiotelephone controller 4A. The receiving intermediate frequency signal is converted by an A/D converter 25 into a digital signal, and supplied to a digital demodulator 26. The digital demodulator 26 digital-demodulates the receiving intermediate frequency signal for conversion into a receiving baseband signal. The receiving baseband signal from the digital demodulator 26 contains a digital receiving-speech signal and a digital control signal. Among them, the digital control signal is taken in by the radiotelephone controller 4A, which identifies it. On the other hand, the digital receiving-speech signal undergoes equalization of the demodulated wave at an equalizer (not shown), and is then supplied to a channel-encoder/decoder (hereinafter, referred to as the channel-codec) 27. The channel-codec 27 performs error correcting-and-decoding of the digital receiving-speech signal from the equalizer. The digital receiving-speech signal subjected to the error correcting-and-decoding process is supplied to a speech-encoder/decoder (hereinafter, referred to as the speech-codec) 28. The speech-codec 28 performs speech decoding of the digital receiving-speech signal.

The digital receiving-speech signal from the speech-codec 28 is converted by a D/A converter 31 into an analog receiving-speech aural signal, and then supplied to a changeover switch 32. The changeover switch 32 is operated by the changeover control signal SS from the radiotelephone controller 4A so as to select and supply the analog receiving-speech aural signal from the D/A converter 31 during conversation, and to select and supply the bell ringing signal from the radiotelephone controller 4A during the output of the ringing signal before talking. The analog receiving-speech aural signal passing through the changeover switch 32 is supplied to a variable resistor 33 (VR). The gain of the variable resistor 33 is set according to the receiving-speech gain control signal VS1 from the radiotelephone controller 4A. The receiving-speech aural signal whose sound volume is adjusted by the variable resistor 33 is amplified at a receiving-speech amplifier 34, and then supplied to a speaker 35.

On the other hand, the talker's sending-speech sound is collected by a microphone 36, which in turn converts the collected sound into a sending-speech aural signal. This sending-speech aural signal is amplified at a sending-speech amplifier 37, and then varied in level by a variable resistor 38. The gain of the variable resistor 38 is set according to the sending-speech gain control signal VS2 from the radiotelephone controller 4A. The sending-speech aural signal whose level is varied by the variable resistor 38 is converted by an A/D converter 39 into a digital sending-speech signal, and then supplied to the speech-codec 28. The speech-codec 28 encodes the digital sending-speech signal. Then, the encoded digital sending-speech signal, together with the digital control signal from the controller 4A, is supplied to the channel-codec 27. The channel-codec 27 performs the error correcting-and-encoding process of the digital sending-speech signal and digital control signal. This encoded digital sending-speech signal is supplied to a digital modulator 29, which, using the encoded digital sending-speech signal as a modulating signal, digital-modulates a carrier wave according to the radio channel frequency. The digital modulating system is, for example, the $\pi/4$ shifted DQPSK (differentially encoded quadrature phase shift keying) system. The modulated signal from the digital modulator 29 is converted by a D/A converter 30 into an analog signal, and then supplied to a transmitter 23. The transmitter 23 mixes the modulated carrier signal with the transmitting local oscillation signal from the frequency synthesizer 24 for conversion into a radio channel frequency, and then carries out power amplification of the resulting signal to a specified transmitting power level. The radio carrier signal from the transmitter 23 is fed via the duplexer 21 to the antenna 1, which transmits the signal to the base unit.

The console unit is provided with a group of key switches and a display 45. The display 45 is made up of, for example, a liquid-crystal display. The key switch group includes a dial key pad 41, a call originating/terminating 42, a talking mode specifying key 43, and a using space mode specifying key 44. The talking mode specifying key 43 is used for the user to specify either the handset talking mode or the hand-free talking mode. The using space mode specifying key 44 is used for the user to specify either the in-a-car mode or the field mode for the using space mode. The in-a-car mode is suitable for talking in a relatively small space like in a car. The field mode is suited for talking in the open air or in a relatively large room, for example.

A power supply circuit 5 contains a battery 51 and a voltage converter 52. The voltage converter 52, using the output of the battery 51, produces a desired operating voltage Vcc and supplies it to the above respective circuits. The battery 51, which is composed of secondary cells, is charged by the direct-current power supply output from the attached charging unit 3 on which the battery is placed. Numeral 54 indicates a charging current limiting resistance and 53 a reverse-flow preventing diode.

The radiotelephone controller 4A contains a microprocessor, to which a ROM, a RAM, and an input/output port are connected via a bus. The ROM previously stores all control programs necessary for radio communication and part of control data. The RAM memorizes transmission/reception control information necessary for radio communication including the dial information and mode specifying information entered from the key group. Based on the control programs and control data in the ROM and the control information in the RAM, the microprocessor executes various control processes related to radio communication. Those control processing function includes a talking mode judging function, a using space mode judging function, a gain control function for controlling the gains of variable resistors 33 and 38, and an echo canceler control function.

The talking mode judging function judges whether the talking mode specified by the user is the handset talking mode or the hand-free talking mode from the changeover position of the talking mode specifying switch 43. The using space mode judging function judges whether the using space mode specified by the user is the in-a-car mode or the field mode from the changeover position of the using space mode specifying switch 44. The gain control function performs 3-stage variable control of the attenuation of the receiving-speech variable resistor 33 and sending-speech variable resistor 38, on the basis of the judgment results of the talking mode and the using space mode at the start of talking after an originating/terminating call and during conversation.

When the taking mode or using space mode is specified at the start of talking after an originating/terminating call and during conversation, the echo canceler control function produces echo canceler control information corresponding to talking conditions at that time and supplies it to the base unit. The echo canceler control information is composed of information used to turn on and off the echo canceler and delay information used to perform initial setting of the characteristics of the echo canceler. The delay information is made up of information on processing delay times for the digital demodulator 26, digital modulator 29, channel-codec 27, speech-codec 28, and others, and information on the acoustic echo path between the speaker 35 and microphone 36. Those pieces of information are obtained by theoretical calculations or by measurements, and then stored in the RAM of the controller 4A.

Figure 2:
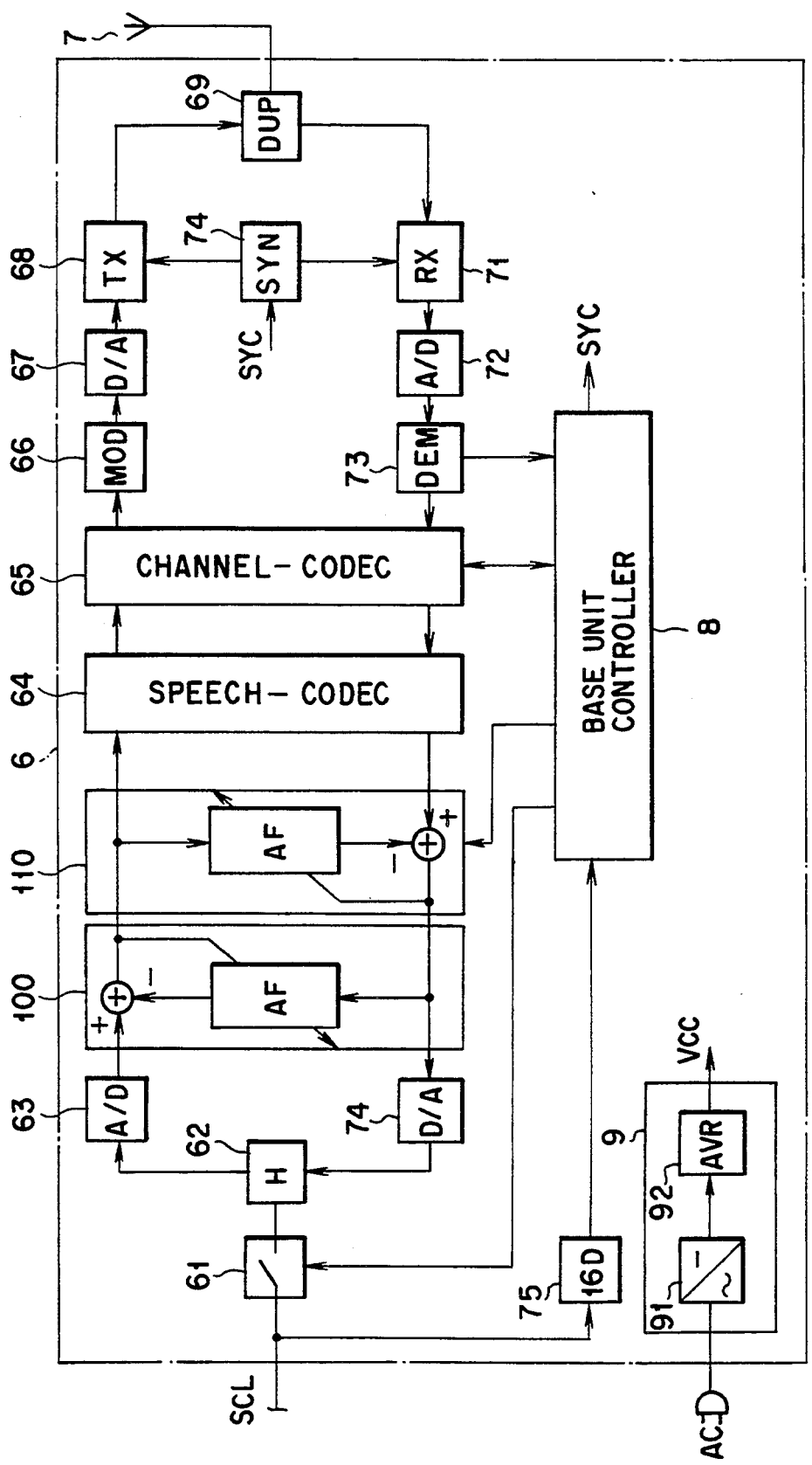
FIG. 2 is a block diagram showing the construction of a base unit of the radiotelephone system of the first embodiment.

On the other hand, the base unit of the cordless telephone system is constructed as shown in the form of a block diagram in FIG. 2. In the figure, the radio carrier signal from the radiotelephone 2A is received at an antenna 7, and then supplied to a receiver 71 via a duplexer 68. The receiver 71 mixes the received carrier signal with the receiving local oscillation signal from a frequency synthesizer 74 for frequency conversion into an intermediate frequency signal. The frequency of the receiving local oscillation signal generated at the frequency synthesizer 74 is specified by the control signal SYC from a base unit (device) controller 8. The receiving intermediate frequency signal is converted by an A/D converter 72 into a digital signal, and supplied to a digital demodulator 73. The digital demodulator 73 demodulates the receiving intermediate signal into a receiving digital baseband signal. The receiving baseband signal from the digital demodulator 73 contains a digital receiving-speech signal and a digital control signal. Among them, the digital control signal is taken in by the base unit controller 8, which identifies it.

The digital receiving-speech signal undergoes equalization of the demodulated wave at an equalizer (not shown), and is then subjected to error correcting and decoding at a channel-codec 65. The digital receiving-speech signal subjected to the error correcting-and-decoding process is decoded at a speech-codec 64, and then supplied to a first echo canceler 110. The first echo canceler 110, which is used to cancel an acoustic echo generated between the speaker 35 and microphone 36 of the radiotelephone 2A, carries out the canceling operation under the control of the base unit controller 8. The digital signal whose echo is canceled at the first echo canceler 110 passes through a second echo canceler 100, and is then converted by a D/A converter 74 into an analog speech signal. This analog speech signal is sent to a subscriber's line SCL via a hybrid circuit 62 and a line switch 61. The subscriber's line SCL is connected to the switching system of a wire telephone network (not shown). The line switch 61 creates a speech path in the subscriber's line SCL and generates dial pulses.

On the other hand, the 16-Hz ringing signal sent over the subscriber's line from the switching system of the wire telephone network is sensed at a call-incoming sensing circuit 75, which reports the result to the base unit controller 8. The speech signal sent from the telephone of the other party connected to the wire telephone network is supplied to an A/D converter 63 via the line switch 61 and hybrid circuit 62. The speech signal is converted by the A/D converter 63 into a digital speech signal, and then supplied to the second echo canceler 100. The second echo canceler 100 performs signal processing to cancel a circuit echo caused by the mismatching of the hybrid circuit 62. The second echo canceler carries out the echo canceling process under the control of the controller 8.

The digital speech signal whose circuit echo is canceled at the second echo canceler 100 passes through the first echo canceler 110, and enters the speech-codec 64, which encodes it. The encoded digital speech signal undergoes error correcting and encoding at the channel-codec 65 to which the digital control signal is supplied from the controller 8, and the resulting signal is supplied to a digital modulator 66. The digital modulator 66, using the digital speech signal from the channel-codec 65 as a modulating signal, performs digital modulation of the carrier wave according to the radio channel frequency. The modulated signal from the digital modulator 66 is converted by a D/A converter 67 into an analog signal, and then supplied to a transmitter 68. The transmitter 68 mixes the modulated carrier signal with the transmitting local oscillation signal from the frequency synthesizer 74 for conversion into a radio channel frequency, and then carries out power amplification of the resulting signal to a specified transmitting power level. The radio carrier signal from the transmitter 68 is fed via the duplexer 69 to the antenna 7, which transmits the signal to the radiotelephone 2A.

The base unit controller 8 has its main control section composed of, for example, a microcomputer. The microcomputer has an echo canceler control function in addition to normal control functions including radio-channel setting control and talking path control. The echo canceler control function controls the first echo canceler 110 in performing the echo canceling process on the basis of the echo canceler control information sent from the radiotelephone 2A.

Numeral 9 indicates a power supply circuit, which is provided with an alternating-current-to-direct-current converter 91 and a stabilizing circuit 92. The stabilizing circuit 92 stabilizes the direct-current voltage supplied from the alternating-current-to-direct-current converter 91. The stabilized direct-current voltage Vcc is supplied to each circuit of the base unit 6.

Figure 3:
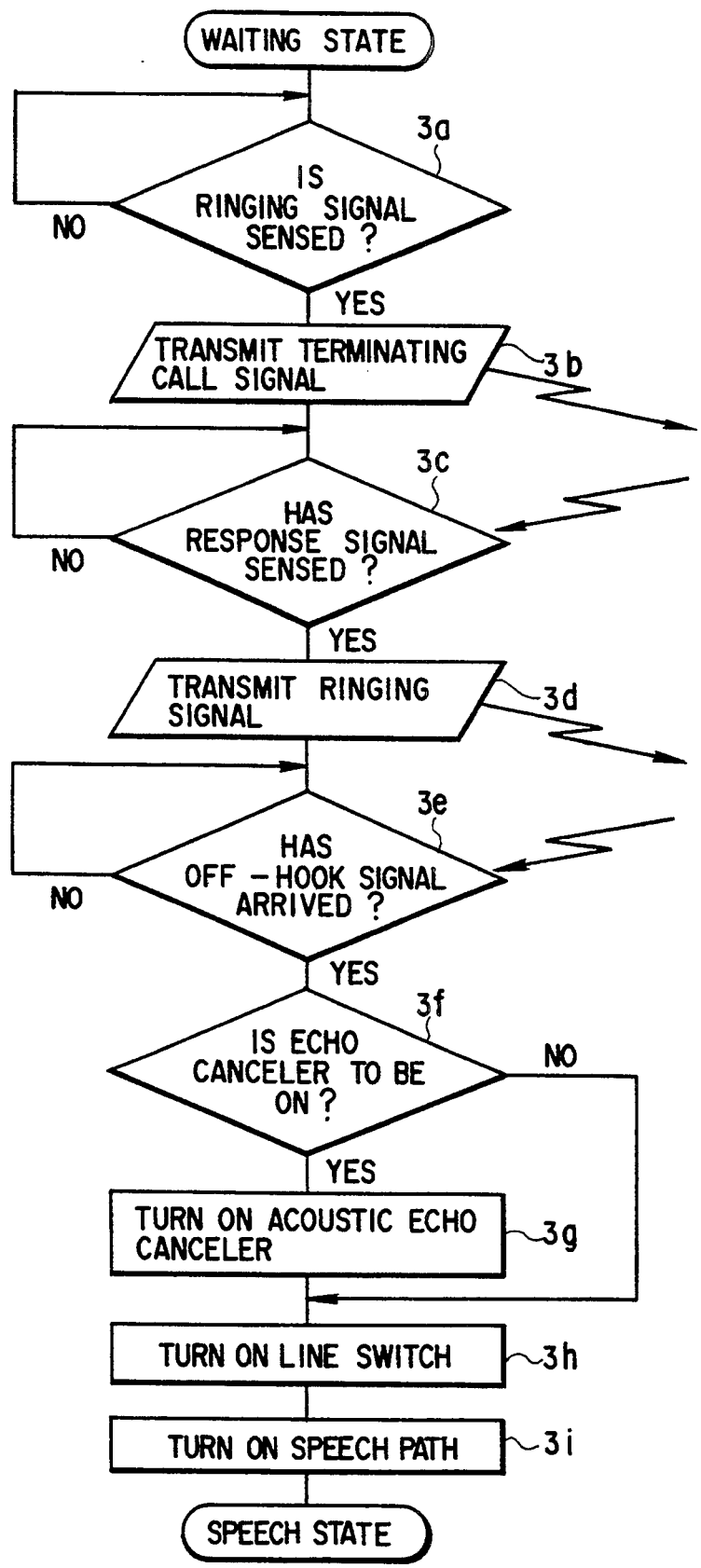
FIG. 3 is a flowchart showing the control procedure of the control circuit of the base unit in FIG. 2.
Figure 4A:
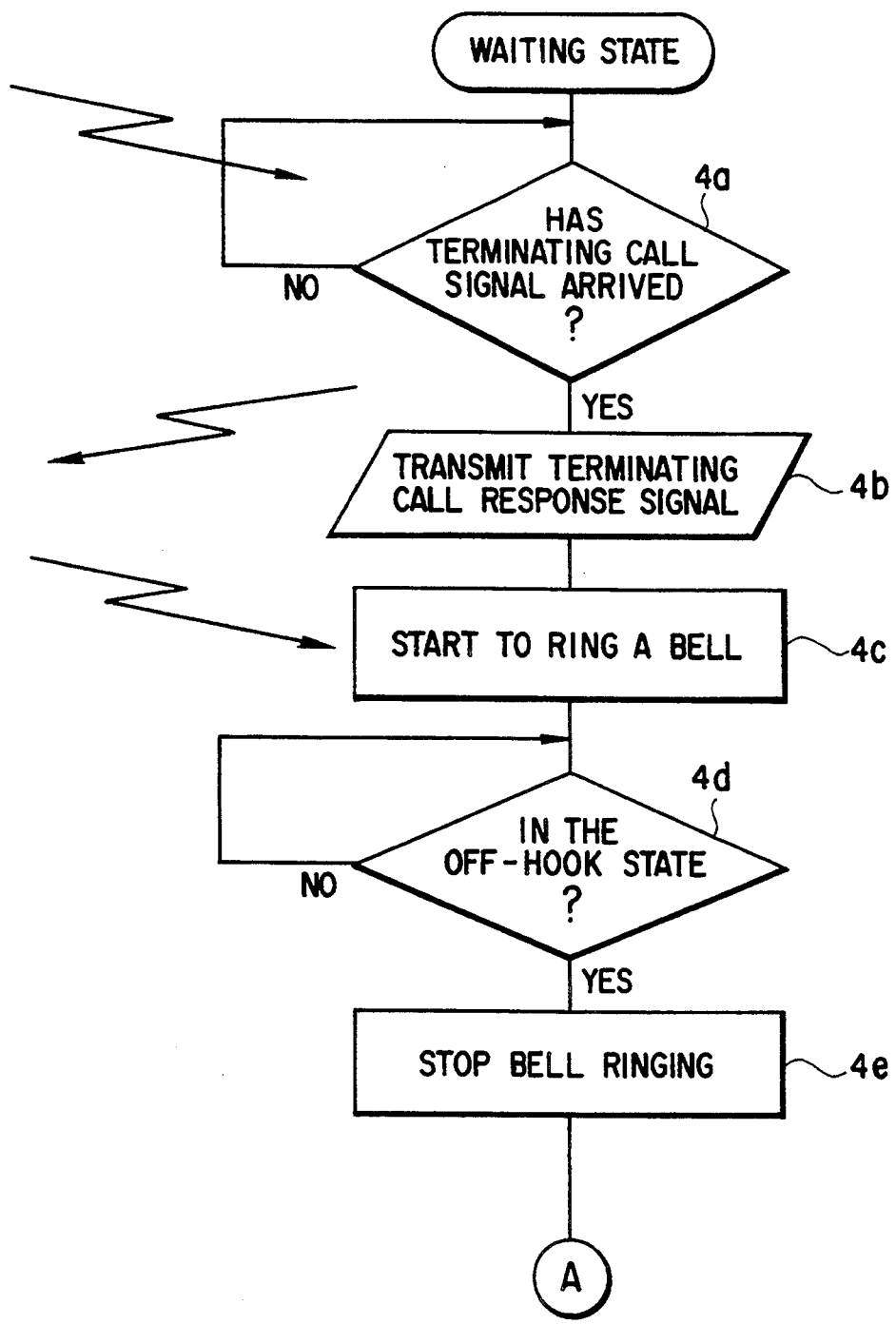
FIGS. 4A and 4B are a flowchart showing the control procedure of the control circuit of the radiotelephone in FIG. 1.
Figure 4B:
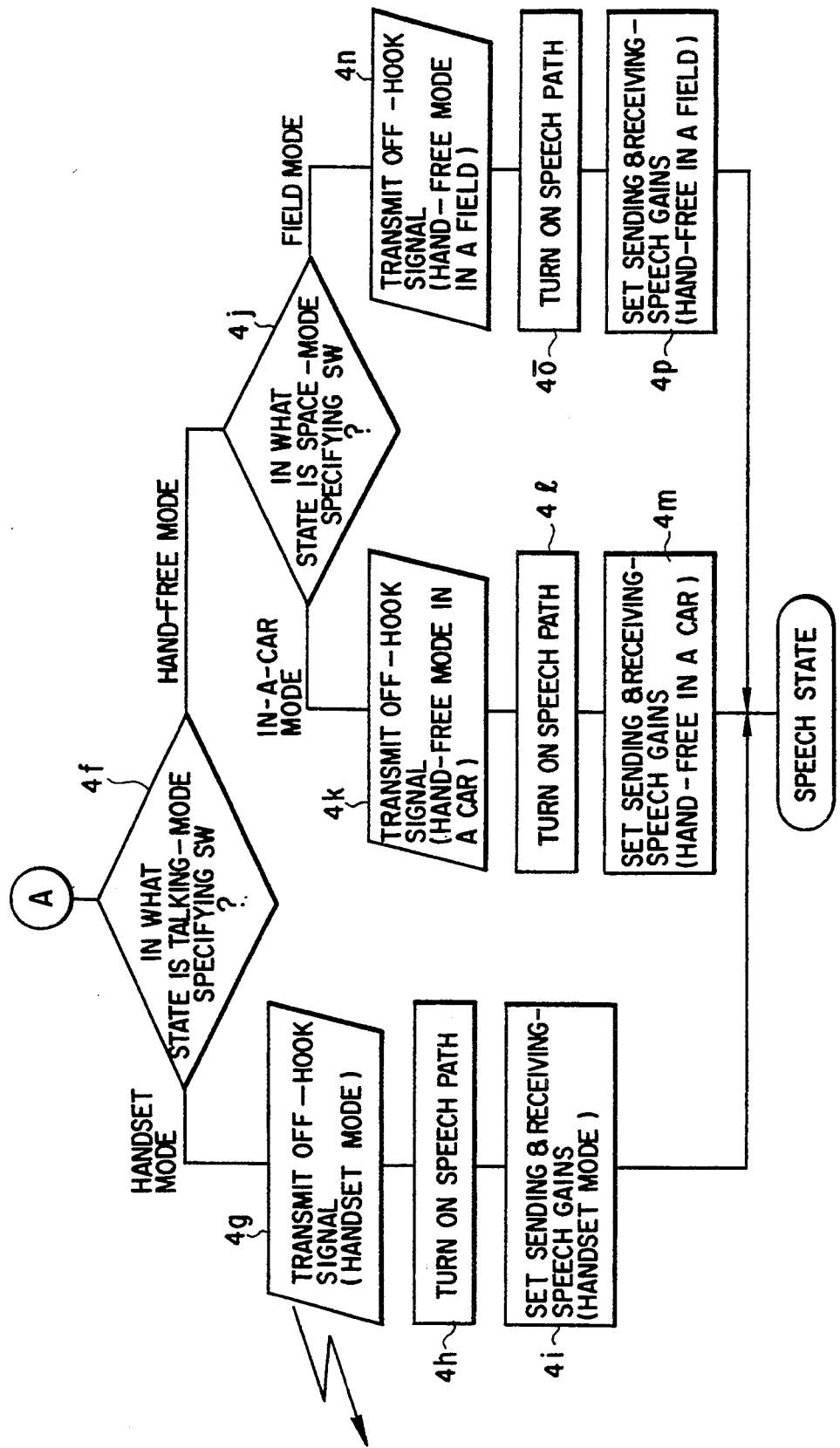

The operation of the digital cordless telephone system thus constructed will be explained, referring to the flowcharts shown in FIG. 3, FIGS. 4A and 4B.

In the radiotelephone 2A, when power is turned on, the radiotelephone controller 4A performs initial setting of each circuit including itself. After the initial setting is complete, from this time on, the calling operation and the arrival of the terminating call are monitored repeatedly in the controller 4A.

On the other hand, the base unit 6 is constantly watching whether or not the ringing signal (a 16-Hz signal) from the switching system of the wire telephone network (not shown) has arrived and whether or not the calling signal from the radiotelephone 2A has arrived.

It is assumed that the ringing signal has just arrived from the switching system in this state. Then, the arrival of the ringing signal will be sensed at the call-incoming sensing circuit 74, which reports this to the controller 8. Recognizing the arrival of the ringing signal at step 3a of FIG. 3, the controller 8 proceeds to step 3b. At step 3b, after a plurality of speech radio channels are searched for an idle channel, a terminating call signal including information specifying the idle radio channel is produced and transmitted to the radiotelephone 2A. When the transmission of the terminating call signal is completed, the controller 8 monitors the return of the terminating call response signal from the radiotelephone 2A at step 3c. After the terminating call response signal is sent back, a ringing signal is sent to the radiotelephone 2A at step 3d.

In contrast, when the controller 4A of the radiotelephone 2A senses the terminating call signal from the base unit 6 at step 4a, it produces a terminating call response signal at step 4b and sends it back to the base unit 6. Then, receiving the ringing signal from the base unit 6, the controller starts to ring the bell to inform the user of call incoming at step 4c. The bell ringing is done by causing an oscillator (not shown) in the controller 4A to supply a bell ringing signal with the changeover switch 32 in the position of controller 4A, so as to allow the ringing signal to drive the speaker 35. When a sounder is provided in addition to the speaker 35, bell ringing may done by supplying the bell ringing signal to the sounder. After the bell ringing is started, the controller 4A displays the talking mode and using space mode specified by the talking mode specifying switch 43 and using space mode specifying switch 44 on the screen of the display 45.

During the bell ringing, the controller 4A monitors the off-hook operation by the user at step 4d. In this state, for example, when the user makes a response by turning on the call originating/terminating key 42, the controller 4A stops the bell ringing at step 4e, and then judges the state of the talking mode specifying switch 43 at step 4f.

Here, for example, it is assumed that the handset talking mode is specified for the talking mode. Then, the controller 4A proceeds to step 4g, at which it produces an off-hook signal containing information showing the handset talking mode, and transmits this off-hook signal to the base unit 6. Next, at step 4h, it creates a speech path by setting a radio channel previously specified by the base unit 6 between the base unit 6 and itself. Then, at step 4i, the controller supplies gain control signals VS1 and VS2 for the handset talking mode to the receiving-speech variable resistor 33 and the sending-speech variable resistor 38, respectively. As a result, relatively large attenuations suitable for handset talking are set for the receiving-speech variable resistor 33 and the sending-speech variable resistor 38, respectively.

In contrast, finishing the transmission of the ringing signal at step 3d, the controller 8 of the base unit 6 monitors the arrival of the off-hook signal at step 3e. When receiving the off-hook signal from the radiotelephone 2A, the controller judges the talking mode set at the radiotelephone 2A from the information indicating the talking mode contained in the off-hook signal. For example, it is assumed that the talking mode is judged to be the handset talking mode. The controller 8 then Judges that it is unnecessary to operate the first echo canceler 110 to cancel an acoustic echo, and moves to step 3h, at which it turns on the line switch 61. At step 3i, it sets a radio channel between the radiotelephone 2A and itself to turn on a speech path, and from this time on, goes to the conversation state. The second echo canceler 100 for canceling a circuit echo is always set in an operative state.

On the other hand, it is assumed that the hand-free talking mode is specified in the radiotelephone 2A. In this case, the controller 4A of the radiotelephone 2A recognizes the hand-free talking mode from the state of the talking mode specifying switch 36, and then proceeds to step 4J. At step 4j, the controller judges whether the using space mode is the in-a-car mode or the field mode from the changeover state of the using space mode specifying switch 44.

As a result of the judgment, the field mode suited for a relatively large space outdoors or indoors is assumed to be specified for the using space mode. Then, the controller 4A moves from step 4j to the step 4n, at which it produces an off-hook signal containing information showing the hand-free in a field mode, and transmits this off-hook signal to the base unit 6. At this time, the off-hook signal is given information used to turn on the acoustic echo canceler 110 and delay information used to carry out initial setting of the echo canceler's characteristics. The delay information is made up of information on a processing delay time for each circuit of the sending and receiving speech system, and information on the acoustic echo path in the field space. These pieces of information are read from the RAM of the controller 4A. Finishing the transmission of the off-hook signal, the controller 4A goes to step 4o, at which it turns on a speech path by setting a radio channel between the base unit 6 and itself. Then, at step 4p, the controller supplies gain control signals VS1 and VS2 for the field mode and the hand-free talking mode to the receiving-speech variable resistor 33 and sending-speech variable resistor 38. As a result, attenuations suited for hand-free talking in the field space are set for the receiving-speech variable resistor 33 and sending-speech variable resistor 38. For the attenuation, a smaller value than the attenuation in the handset talking mode is selected. From now on, therefore, when talking is done in this state, the radiotelephone 2A produces a receiving speech with a sufficiently large sound volume suitable for the field space, or a sending speech signal of sufficiently high level. Consequently, the user can perform hand-free talking in the field space without any trouble.

In contrast, the in-a-car mode is assume to be set for the using space mode. Then, the controller 4A moves from step 4j to step 4k, at which it produces and transmits an off-hook signal to the base unit 6. At this time, the off-hook signal is given information used to turn on the acoustic echo canceler 110 and delay information used to carry out initial setting of the echo canceler's characteristics. The delay information is made up of information on a processing delay time for each circuit of the sending and receiving speech system, and information on the acoustic echo path in the in-a-car space. These pieces of information are read from the RAM of the controller 4A. Finishing the transmission of the off-hook signal, the controller 4A turns on a speech path by setting a radio channel between the base unit 6 and itself at step 4l. Then, at step 4m, the controller supplies gain control signals VS1 and VS2 corresponding to the hand-free mode in a car to the receiving-speech variable resistor 33 and sending-speech variable resistor 38. As a result, attenuations suited for hand-free talking in a car are set for the receiving-speech variable resistor 33 and sending-speech variable resistor 38, respectively. The attenuation is set to a value smaller than the attenuation in the handset talking mode and larger than the value for hand-free talking in the field mode. Therefore, the telephone 2A produces a receiving speech with a reasonably large sound volume suitable for the relatively small in-a-car space, and a sending speech signal of an appropriate level. Consequently, the user can perform hand-free talking in a car with the optimum sending and receiving speech characteristics.

In contrast, when the off-hook signal is sent back from the radiotelephone 2A, the controller 8 of the base unit 6 extracts the echo canceler control information from the off-hook signal at step 3f, and based on this information, judges whether or not the first echo canceler 110 should be turned on. If having judged that the first echo canceler 110 should be turned on, it turns on the first echo canceler 110 at step 3g. At this time, based on the delay information contained in the off-hook signal, the controller obtains the optimum tap coefficient, and then initially sets this optimum coefficient for the adaptive filter (AF) of the first echo canceler 110. Thus, In the first echo canceler 110, a learning action to estimate the optimum tap coefficient is omitted, so that the canceling of an acoustic echo is begun under the best conditions from the start of talking.

When talking preparations are completed, the controller 8 of the base unit 6 turns on the line switch 61 at step 3h, and then turns on a speech path by setting a radio channel between the radiotelephone 2A and itself at step 3i. From this time on, it goes to the conversation state.

With the present embodiment, since the radiotelephone 2A is provided with the hand-free talking mode as well as the handset talking mode, even if the radiotelephone 2A is of the hand-held type, it allows hand-free talking while being placed on the desk. In this case, the existing speaker and microphone for handset talking are also used as those for hand-free talking, thereby preventing the construction of the radiotelephone 2A from becoming more complex and larger. Further, use of the receiving-speech variable resistor 33 and sending-speech variable resistor 38 enables variable setting of the gains in the sending-speech path and receiving-speech path to the best values in handset talking and hand-free talking, respectively. This allows conversation with the best sound volume both in handset talking and hand-free talking.

With the present embodiment, the using space mode specifying switch 44 is provided which is used to selectively specify the in-a-car mode and the field mode for the using space mode. Based on the using space mode specified by the switch 44, the gains in the sending-speech path and receiving-speech path are variably set to the best values. For this reason, in both cases where the using space is a relatively small space such as in a car and where it is a relatively large space outdoors or indoors, hand-free talking can be done with a suitable sound volume suited for each space. In the present embodiment, the mode specifying switches 43 and 44 are used to independently specify the talking mode and using space mode. This allows the user to set the talking mode and the using space mode according his desire before making a call.

Further, with the present embodiment, the first echo canceler 110 for canceling an acoustic echo is provided in the sending and receiving speech path in preparation for the hand-free talking mode. For hand-free talking, the first echo canceler 110 is operated, which allows high-quality speech with a smaller amount of acoustic echoes. This feature is very useful for the digital cordless telephone system since the processing delay time in each codec is relatively large.

Since in the present embodiment, the first echo canceler 110 is provided in the base unit 6, not in the radiotelephone 2A, this makes it possible to simplify the circuit arrangement of the radiotelephone 2A for a more compact, lightweight design with lower cost. This feature is very effective for the cordless telephone system since making the radiotelephone 2A more compact and lightweight is one of the most important problems. With the present embodiment, before talking is started, the delay information on the radiotelephone 2A is sent from the radiotelephone 2A to the base unit 6, which then initially sets the optimum tap coefficient for the first echo canceler 110 on the basis of the delay information. This reduces the capacity of the buffer memory of the first echo canceler 110 and simplifies the processing program. This also makes it possible to shorten the time required for training the entire system including training the echo canceler itself.

To operate the acoustic echo canceler without transferring the delay information from the radiotelephone to the base unit, the echo canceler must be constructed so as to deal with any acoustic echo. The acoustic echo canceler is generally constructed so that the speech signal extracted at the adaptive filter may be temporarily stored in the buffer memory, and then compared with the input signal. Because of this, when the delay amount of the acoustic echo is indefinite, the extracted speech signal has to be retained in the buffer memory for a sufficiently long time, which requires a buffer memory with a large capacity as well as a complicated, huge processing program. Although it is conceivable that a plurality of echo cancelers corresponding to various types of echoes predicted are prepared, and from them, an appropriate echo canceler is selected for use. This approach, however, requires a larger number of echo canceler installed in the base unit, making the circuit configuration of the base unit more complicated and expensive.

A second embodiment of the present invention will be explained.

This embodiment is constructed in a manner that senses whether or not the radiotelephone is placed on the charging unit, and based on the sense result, determines whether to set the talking mode to the handset mode or the hand-free mode.

Figure 5:
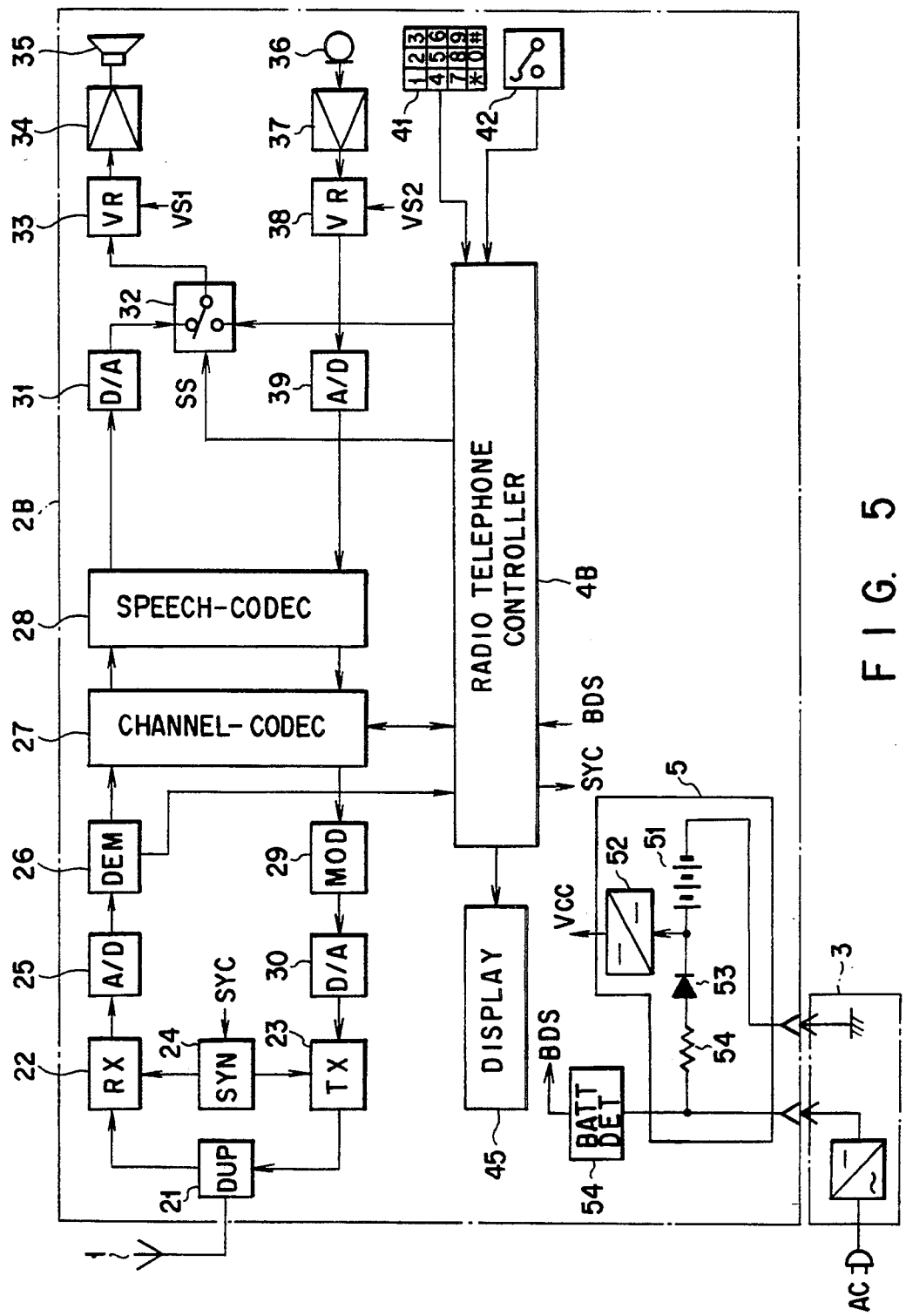
FIG. 5 is a block diagram showing the construction of a radiotelephone according to a second embodiment of the present invention.

FIG. 5 is a block diagram showing the construction of a radiotelephone of the present embodiment. In the figure, the same parts as those in FIG. 1 are indicated by the same reference characters, and their detailed explanation will be omitted. The battery charging circuit of the radiotelephone 2B is connected to a setting sensor 54. The setting sensor 54 judges whether or not the radiotelephone 2B is set on the charging unit 3 from the voltage or current in the charging circuit. Then, the setting sense signal BDS representing the judgment result is supplied to the controller 4B.

Figure 6A:
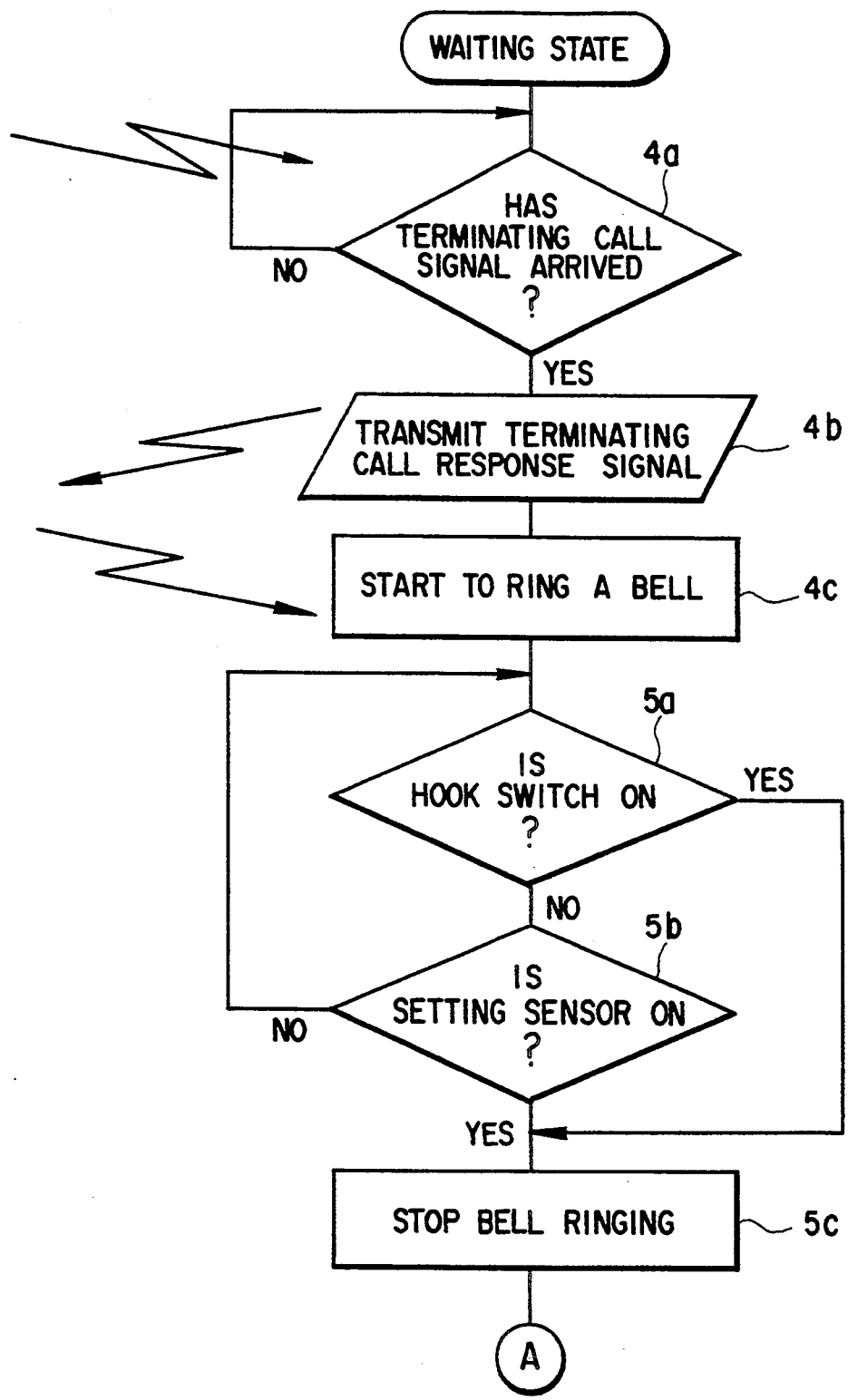
FIGS. 6A and 6B are a flowchart showing the control procedure of the control circuit of the radiotelephone in FIG. 5.
Figure 6B:
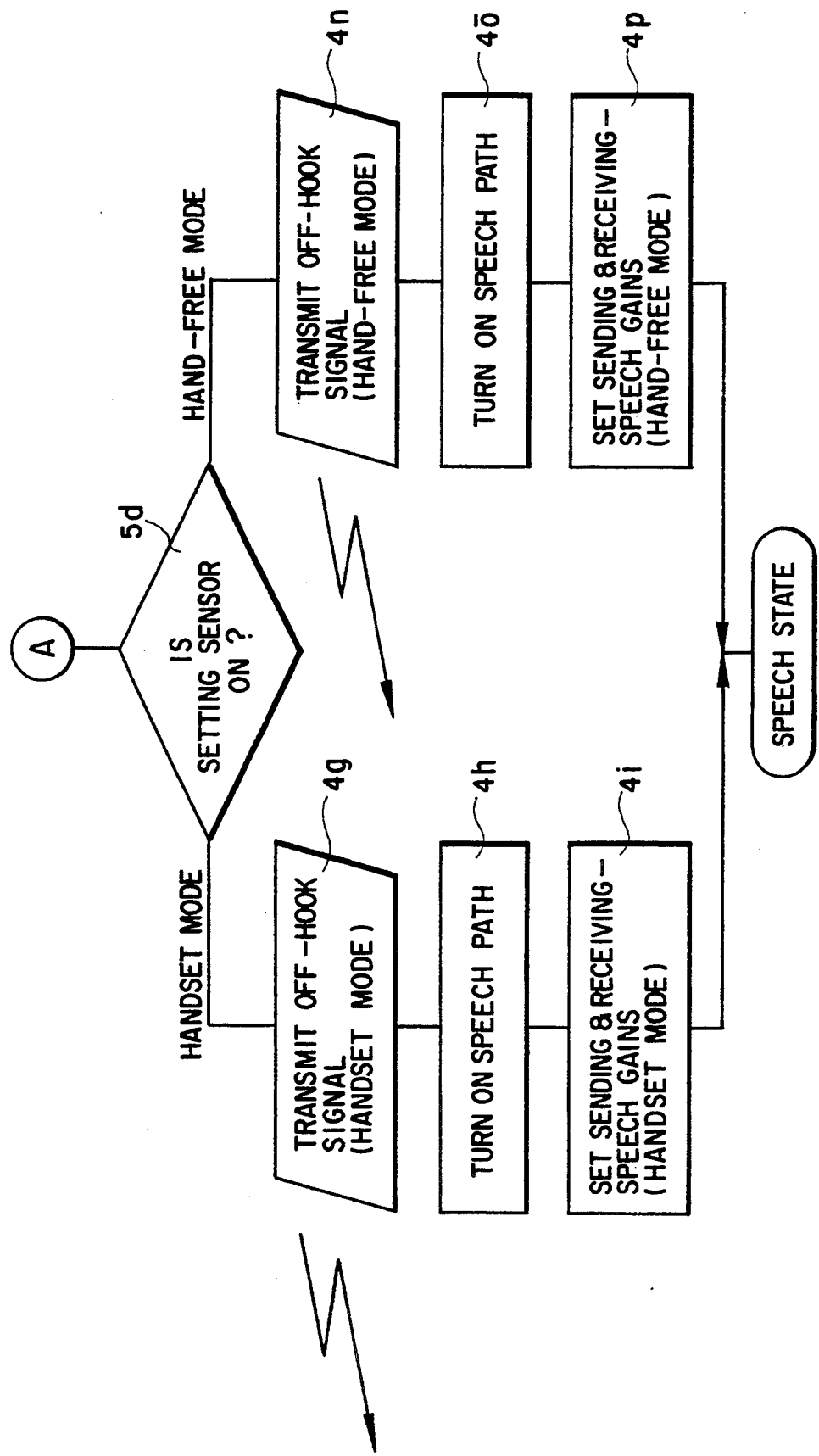

While informing the user of call incoming by bell ringing as shown in FIGS. 6A and 6B, the controller 4B monitors the off-hook operation by the call originating-/terminating key 42 at step 5a, as well as the sense signal BDS from the setting sensor 54 at step 5b. With the monitoring, when it is sensed that the off-hook operation has been made with the call originating/terminating key 42, or that the radiotelephone 2B has been lifted from the charging unit 3, it is judged to be off-hook. Once the off-hook has been sensed, the controller 4B stops the bell ringing at step 5c, and then judges whether or not the setting sensor 54 is on at step 5d. When this judgment shows that the setting sensor 54 is off, that is, the radiotelephone 2B has been lifted, then it is judged to be in the handset talking mode, and steps 4g to 4i are executed. After this, the radiotelephone is brought into the speech state. In contrast, when it is recognized that the setting sensor 54 is on, that is, the radiotelephone 2B is left on the charging unit 3, it is judged to be in the hand-free talking mode. Then, after steps 4n to 4p are executed, the radiotelephone is placed into the speech state. The controller 4B displays the talking mode on the screen of the display 45 according to the judgment result of step 5d.

With this arrangement, the talking mode specifying switch 43 can be eliminated, so that the configuration of the console unit section can be made simpler and more compact accordingly. After the radiotelephone B is once lifted from the charging unit 3 to set the handset talking mode, to change the mode to the hand-free talking mode, this can be done by pressing the call originating/terminating key 42 for a short time, for example. In this case, the transfer of the speech signal should be interrupted during conversation, and instead, the talking mode and delay amount information be reported. To change the hand-free talking mode to the handset talking mode, this can be done by pressing the call originating/terminating key 42 for a short time as described above.

In this embodiment, a case where the using space mode is not specified has been explained. It is possible, however, to provide the using space mode specifying switch 44 as with the first embodiment, and set the talking mode and the using space mode on the basis of the changeover state of the switch 44 and the sense signal BDS from the setting sensor 54, and then control the speech path gain and others according to the set mode.

A third embodiment of the present invention will be explained.

This embodiment is constructed in a manner that prepares a fixing case 20A for securing the radiotelephone body 2C to the inside of a car aside from the radiotelephone body 2C, senses whether or not the body 2C is mounted on the case 20A, and based on the sense result, sets one of three types of mode. The three types of mode are the handset talking mode, the hand-free talking mode in a car, and the hand-free talking mode in a field space.

FIG. 7 is a block diagram showing the construction of a radiotelephone of the present embodiment. In the figure, the same parts as those in FIG. 1 are indicated by the same reference characters, and their detailed explanation will be omitted.

The mode detector 10 of the radiotelephone body 2C and fixing case 20A are constructed as shown in FIG. 8. Specifically, a first and second concave portions 10a and 10c are formed in the base portion of the radiotelephone 2C. At the bottoms of the concave portions 10a and 10c, a first and second sense terminals 10b and 10d are provided. Each of these sense terminals has a pair of contacts. One of the contacts is connected to the ground for each pair. The other contact is connected to a power supply terminal (5V) via a pull-up resistor, as well as to an interface (I/F) 10g. In the second concave portion 10c, a movable contact 10e is located. The movable contact 10e is supported with a compressed spring 10f to the concave portion bottom so as to be kept away from the sense terminal 10d in a normal state.

The internal shape and size of the fixing case 20A are determined according to the external shape and size of the radiotelephone body 2C so that the body 2C may be installed and removed with ease. At the base portion of the case, a projecting portion 20a and a concave portion 20c are formed. The shape and size of the projecting portion 20a are determined so as to be installed and removed in and from the first concave portion 10a of the mode sensing section 10. At the top of the projecting portion 20a, a metal contact 20b is fixed. With the radiotelephone body 2C in the fixing case 20A, the metal contact 20b short-circuits the contacts with each other of the first sense contact 10b of the first concave portion 10a. In contrast, the width and depth of the concave portion 2c are made larger than the movable contact 10e of the mode sensing section 10. Thus, with the radiotelephone body 2C in the fixing case 20A, the movable contact 10e is in the concave portion 20c, and consequently inoperative, with the result that the contacts of the sense terminal 10d are not short-circuited with each other.

Figure 13:
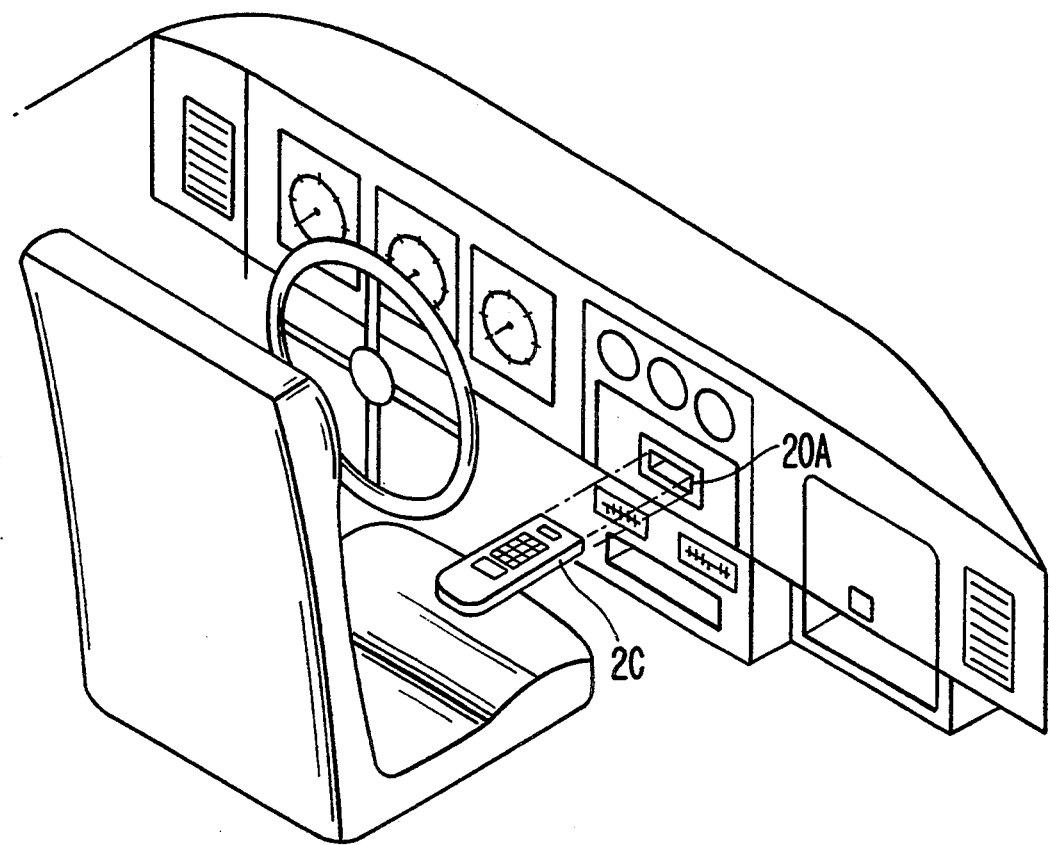
FIG. 13 is a view showing a specific place in a car where hand-free talking is possible.

With this arrangement, if the radiotelephone body 2C is put in the fixing case 20A secured to, for example, the dashboard for hand-free talking in the car as shown in FIG. 13, then the metal contact 20b touches the first sense terminal 10b as shown in FIG. 9A. Because of this, the contacts of the first sense terminal 10b are short-circuited with each other, which permits the ground-level (low-level) sense signal to be supplied to the interface 10g. In contrast, the movable contact 10e is in the concave portion 20c, not being pressed, with the result that the contacts of the second sense terminal 10d are not short-circuited. This allows a power supply voltage level (high level) sense signal to be supplied from the second sense terminal 10d to the interface 10g. As a result, the mode sense signal MDS specifying the in-a-car mode for the using space mode, and the hand-free talking mode is supplied from the interface 10g to the controller 4C. Based on the mode sense signal MDS, the controller 4C executes gain control of the sending and receiving speech path and control of the acoustic canceler 110 for hand-free talking in the in-a-car mode. The procedure and description of those controls are the same as those in steps 4k to 4m shown in FIG. 4B.

On the other hand, if the radiotelephone body 2C is placed directly on a table 20B for hand-free talking in a large room, then the movable contact 10e will be pushed up by the top surface of the table 20B, which causes the movable contact 10e to short-circuit the contacts of the second sense terminal 10d. This permits the ground level (low level) sense signal to be supplied from the second sense terminal 10d to the interface 10g. In contrast, the contacts of the first sense terminal 10b are left open, which permits the power supply voltage level (high level) sense signal to be supplied to the interface 10g. As a result, the mode sense signal MDS specifying the field mode for the using space mode and the hand-free talking mode is supplied from the interface 10g to the controller 4C. Based on the mode sense signal MDS, the controller 4C executes gain control of the sending and receiving speech path and control of the acoustic canceler 110 for hand-free talking in the field mode. The procedure and description of those controls are the same as those in steps 4n to 4p shown in FIG. 4B.

When the user performs handset talking either in a car or in a field, the radiotelephone body 2C is neither installed in the fixing case 20A, nor placed on the table 20B. Because of this, the first and second sense terminals 10b and 10d both remain open, which permits two power supply voltage level (high level) sense signals to be supplied to the interface 10g. As a result, the mode sense signal MDS specifying the handset talking mode is supplied from the interface 10g to the controller 4C. Based on the mode sense signal MDS, the controller 4C executes gain control of the sending and receiving speech path and control of the acoustic canceler 110 for handset talking. The procedure and description of those controls are the same as those in steps 4g to 4i shown in FIG. 4B.

With the present embodiment, the talking mode and the using space mode are sensed by the mode sensing section 10, and based on the sense result, the controller 4C executes gain control of the sending and receiving speech path and control of the acoustic canceler 110. That is, the talking mode and the using space mode are automatically set according to the position of the radiotelephone body 2C. Therefore, it is unnecessary for the user to specify the talking mode and the using space mode by switch operation each time he uses the radiotelephone, thereby making it easier to operate the telephone. The talking mode specifying switch 43 and the using space mode specifying switch 44 can be eliminated from the console, making it possible to provide a more compact console unit, consequently a more compact radiotelephone body 2C.

A fourth embodiment of the present invention will be explained.

This embodiment is constructed in a manner that provides a mode specifying switch with three or more changeover positions to set the talking mode and the using space mode at a time, and that provides an acoustic echo canceler for the radiotelephone.

Figure 10:
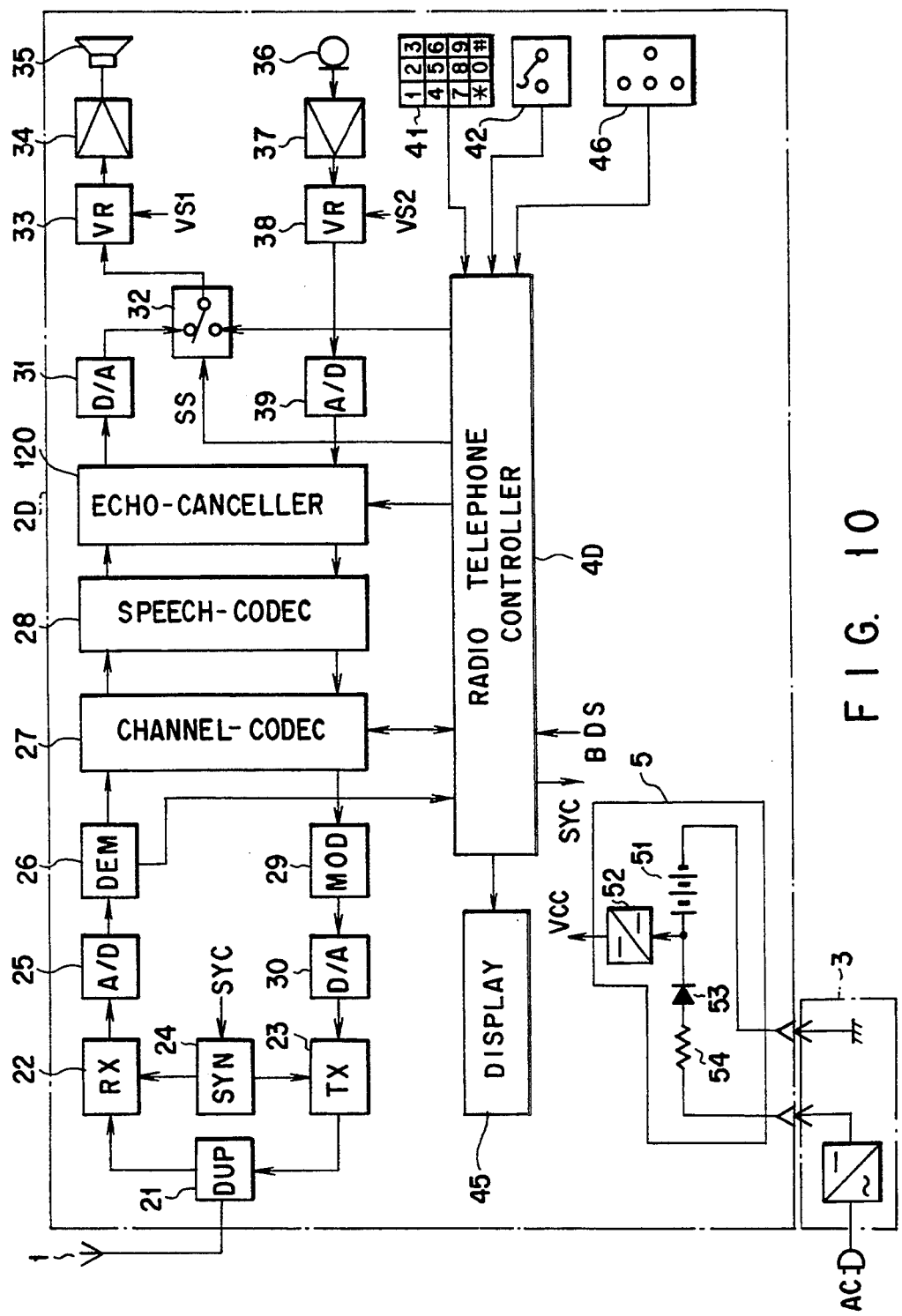
FIG. 10 is a block diagram showing the construction of a radiotelephone according to a fourth embodiment of the present invention.

FIG. 10 is a block diagram showing the construction of a radiotelephone of the present embodiment. In the figure, the same parts as those in FIG. 1 are indicated by the same reference characters, and their detailed explanation will be omitted. In the figure, an acoustic echo canceler 120 is inserted between the speech-codec 28 and the D/A converter 31 and A/D converter 39. The initial setting of a tap coefficient for the echo canceler 120 is done by the controller 4D. The delay information by the using space required for the initial setting of the tap coefficient is previously stored in the RAM of the controller 4D. The console unit is provided with a dial key 41, a call originating/terminating key 42, and a display 45, as well as a mode specifying switch 46. The mode specifying switch 46 is made up of, for example, a slide changeover switch with three changeover positions. The three changeover positions of the changeover switch correspond to the handset talking mode, the hand-free talking mode in a field, and the hand-free talking mode in a car. The changeover information on the mode specifying switch 46 is supplied to the controller 4D.

With this arrangement, the user can specify the talking mode and the using space mode at a time by setting the mode changeover switch 46 to a desired changeover position through sliding operation. Therefore, it is possible to make the console unit compact as compared with the console unit with two mode specifying switches. Since the acoustic echo canceler 120 is provided for the radiotelephone 2D, it is unnecessary to transfer the delay information from the radiotelephone to the base unit via the radio channel for the initial setting of the tap coefficient of the acoustic echo canceler. As a result, the transferring procedure is omitted, thereby simplifying the processing program. Even when the mode is changed during conversation, the transfer of the speech signal is not interrupted due to the transfer of the delay information, improving the speech quality.

The present invention is not limited to the above embodiments, but may be practiced or embodied in still other ways without departing from the spirit or essential character thereof. For instance, in the above embodiments, the delay information required for the initial setting of the acoustic echo canceler is previously stored in the RAM, and is read from the RAM as needed for the initial setting. However, another approach is possible in which a training signal such as a chirp tone is sent to the using space at the start of talking or at the time of mode changing during conversation, and the acoustic echo canceler is caused to learn based on the training signal. This makes it possible to perform the initial setting of the optimum tap coefficient for the echo canceler even if talking is done in any using space.

Further, a contact such as a push-button switch may be provided in a place that the user grips without fail in handset talking, such as the side of the radiotelephone, and based on the state of the contact, it may be judged whether or not it is in the handset talking mode.

In addition, a call originating/terminating key for handset talking and a calk originating/terminating key for hand-free talking may be separately provided to allow specification by pressing the call originating/terminating key corresponding to the desired talking mode at the time of originating/terminating call. Either the handset talking mode or the hand-free mode may be specified by pressing a single call originating/terminating key once or twice consecutively in a short time.

Further, a remote controller using, for example, infrared rays may be provided to send operation information on the call originating/terminating key, dial information, mode specifying information, and others to the radiotelephone when talking in hand-free talking mode is wanted. This allows talking in the hand-free talking mode without touching the radiotelephone at all.

Additionally, while in the above embodiments, two types of the using space mode—the in-a-car mode or the field mode—are used, three or more types of the using space mode may be used to cope with three or more types of using space with different acoustic characteristics.

Furthermore, while, in the above embodiments, a variable resistor has been employed as varying means for varying the level of the speech signal, the varying means may be other elements such as a variable attenuator, a variable amplifier, a combination of an amplifier and a variable resistor, and a combination of an amplifier and a variable attenuator. Any other combinations may be possible. A varying rate of the varying means may be 1.

Figure 11A:
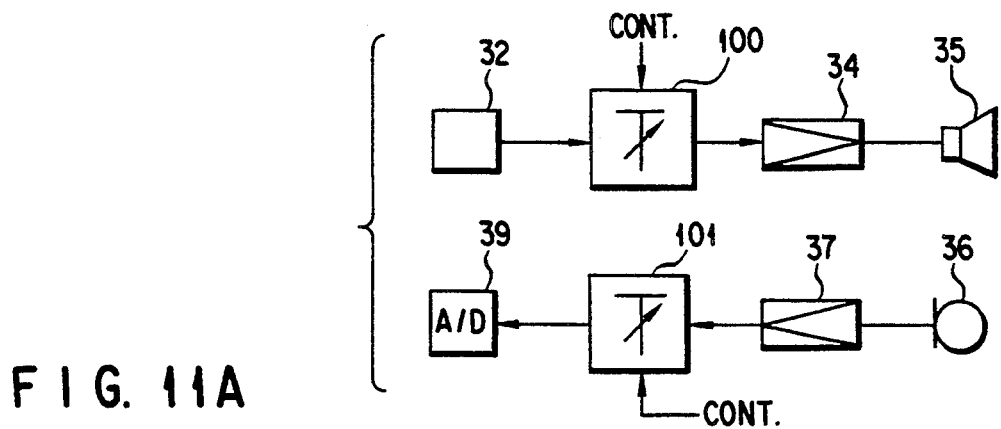
FIGS. 11A to 11C show circuit diagrams of radiotelephones according to the other embodiments of the invention, respectively.
Figure 11B:
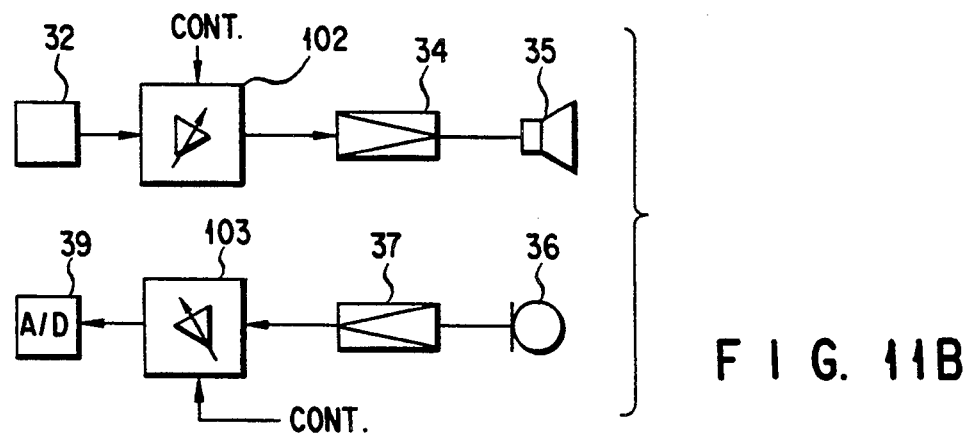
Figure 11C:
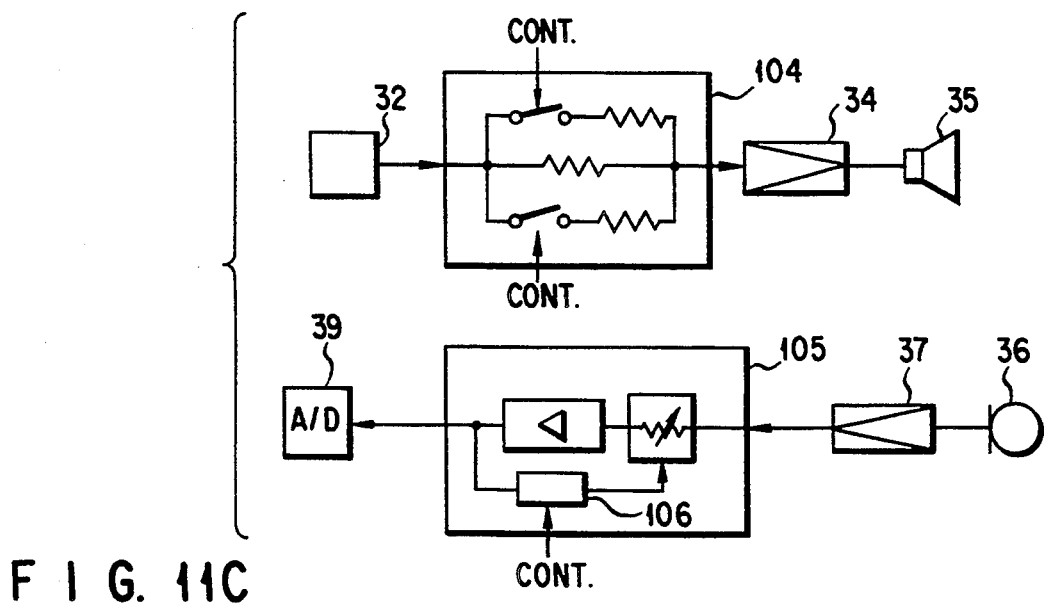
Figure 12:
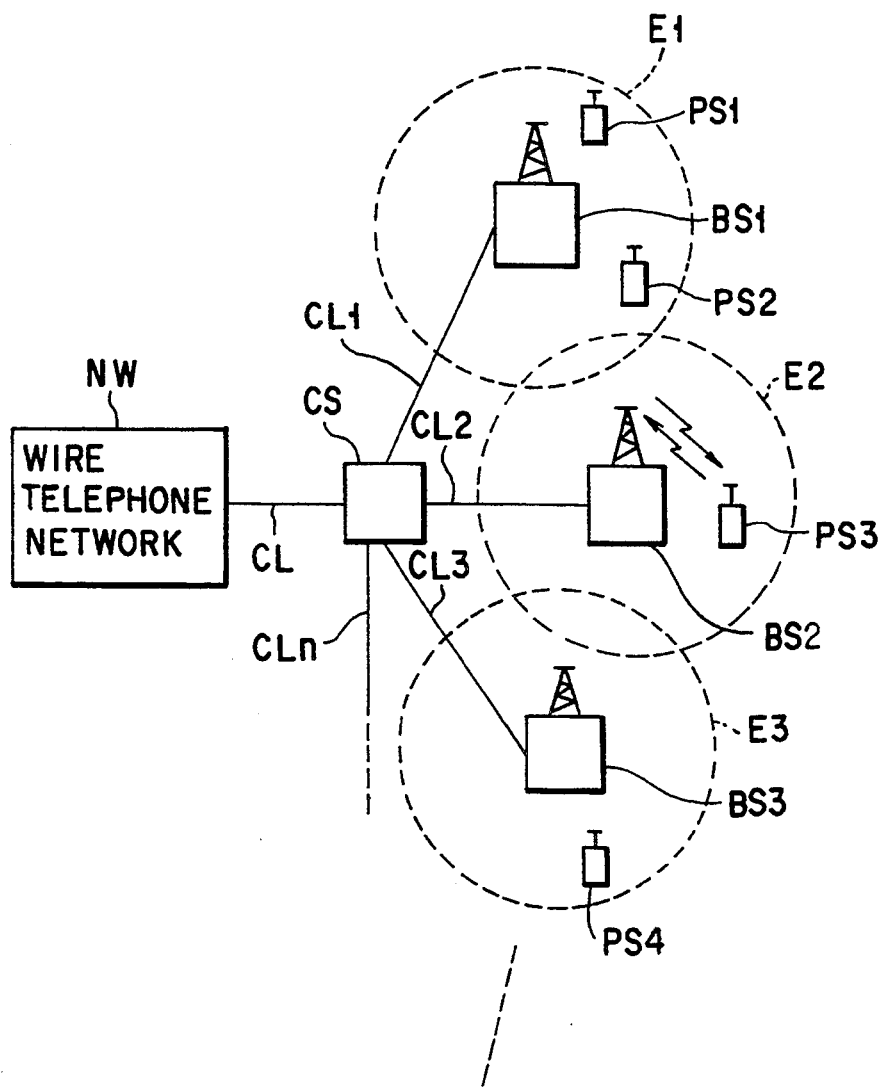
FIG. 12 is a schematic diagram of a cellular radiotelephone system.

FIG. 11 is a block diagram showing other elements as the varying means. In FIG. 11A, the varying means are variable attenuators 100,101 controlled by a radio telephone controller. In FIG. 11B, the varying means are variable amplifier 102,103 controlled by radio telephone controller. In FIG. 11C, the varying means are a variable resistor 104 and a combination circuit 105 of a variable resistor and an amplifier. The variable resistor of the combination circuit 105 is controlled according to an output signal of a resistor controller 106. The resistor controller 106 compares a value of the level of an output signal from the amplifier with a reference value controlled by a radio telephone controller.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A hand-held radiotelephone connected via a radio channel to a base station, comprising:
   a microphone for producing a speech signal corresponding to a user's utterance;
   first level varying means, connected to said microphone, for varying the level of the speech signal from the microphone to produce a level-varied speech signal;
   modulating and transmitting means, connected to said first level varying means, for modulating a carrier signal according to the level-varied speech signal and transmitting the modulated carrier signal via said radio channel to said base station;
   receiving and demodulating means for receiving a carrier signal from said base station via said radio channel and demodulating the received carrier signal into a received speech signal;
   second level varying means, connected to said receiving and demodulating means, for varying the level of the received speech signal to produce a level-varied received speech signal;
   a speaker connected to said second level varying means, for producing a voice signal corresponding to the level-varied received speech signal;
   speech-mode setting means for setting a speech mode to either handset speech mode or a hand-free speech mode; and
   control means for controlling variable level of said first level varying means and said second level varying means according to the speech mode set by said speech-mode setting means.

2. A radiotelephone according to claim 1, wherein said control means comprises gain setting means for setting a gain of each of said first level varying means and said second level varying means to a first value when the handset speech mode is set by said speech-mode setting means, and for setting the gain of each of said first level varying means and said second level varying means to a second value larger than said first value when the hand-free speech mode is set by said speech-mode setting means.

3. A radiotelephone according to claim 1 or 2, wherein said speech-mode setting means includes a manual mode designation switch selectable between at least a first and a second state, and the handset speech mode is set when said manual mode designation switch is in the first state and the hand-free speech mode is set when the manual mode designation switch is in the second state.

4. A radiotelephone according to claim 1 or 2, wherein said speech-mode setting means includes grip sensing means for sensing whether or not said radiotelephone is held in a grip of a user's hand, and the handset speech mode is set when the grip sensing means senses that said radiotelephone is held in the grip of the user's hand and the hand-free speech mode is set when the grip sensing means senses that said radio telephone is not held in the grip of said user's hand.

5. A radiotelephone according to claim 1 or 2, wherein said speech-mode setting means includes placement sensing means for sensing whether or not said radiotelephone is put on a surface, and the handset speech mode is set when the placement setting mode senses that said radiotelephone is not put on a surface, and the hand-free speech mode is set when the placement sensing means senses that said radiotelephone is put on a surface.

6. A radiotelephone according to claim 1 or 2, wherein said speech-mode setting means includes connection sensing means for sensing whether or not said radiotelephone is connected to a charging unit for charging a battery built in the radiotelephone, and the hand-free speech mode is set when the connection sensing means senses that the radiotelephone is connected to the charging unit, and the handset speech mode is set when the connection sensing means senses that the radiotelephone is not connected to the charging unit.

7. A radiotelephone according to claim 1 or 2, wherein said speech-mode setting means sets the speech mode to either the handset speech mode or the hand-free speech-mode according to a number of hook switch operations at a start of a speech communication.

8. A radiotelephone according to claim 1 or 2, wherein said speech-mode setting means includes duration sensing means for sensing a duration of operation of a hook switch during speech communication, and the speech mode is changed when the duration sensing means senses that the hook switch is operated for a period of time shorter than a specific period of time indicating the end of speech.

9. A radiotelephone according to claim 1, wherein said speech-mode setting means includes speech mode display means for displaying the speech mode that is set.

10. A radiotelephone according to claim 3, wherein said speech-mode setting means further includes duration sensing means for sensing a duration of operation of a hook switch during speech communication, and the speech mode is changed when the duration sensing means senses that the hook switch is operated for a period of time shorter than a specific period of time indicating the end of speech.

11. A radiotelephone according to claim 4, wherein said speech-mode setting means further includes duration sensing means for sensing a duration of operation of a hook switch during speech communication, and the speech mode is changed when the duration sensing means senses that the hook switch is operated for a period of time shorter than a specific period of time indicating the end of speech.

12. A radiotelephone according to claim 5, wherein said speech-mode setting means further includes duration sensing means for sensing a duration of operation of a hook switch during speech communication, and the speech mode is changed when the duration sensing means senses that the hook switch is operated for a period of time shorter than a specific period of time indicating the end of speech.

13. A radiotelephone according to claim 6, wherein said speech-mode setting means further includes duration sensing means for sensing a duration of operation of a hook switch during speech communication, and the speech mode is changed when the duration sensing means senses that the hook switch is operated for a period of time shorter than a specific period of time indicating the end of speech.

14. A radiotelephone according to claim 7, wherein said speech-mode setting means further includes duration sensing means for sensing a duration of operation of a hook switch during speech communication, and the speech mode is changed when the duration sensing means senses that the hook switch is operated for a period of time shorter than a specific period of time indicating the end of speech.

15. A radiotelephone system comprising:
a base station connected to a communication network via a wire channel; and
a hand-held radiotelephone connected to said base station via a radio channel; wherein
said hand-held radiotelephone comprises:
a microphone for producing a speech signal corresponding to a user's utterance;
first level varying means, connected to said microphone, for varying the level of the speech signal from the microphone to produce a level-varied speech signal;
modulating and transmitting means connected to said first level varying means, for modulating a carrier signal according to the level-varied speech signal and transmitting the modulated carrier signal via said radio channel to said base station;
receiving and demodulating means for receiving a carrier signal from said base station via said radio channel and demodulating the received carrier signal into a received speech signal;
second level varying means, connected to said receiving and demodulating means, for varying the level of the received speech signal to produce a level-varied received speech signal;
a speaker, connected to said second level varying means, for producing a voice signal corresponding to the level-varied received speech signal;
speech-mode setting means for setting a speech-mode to either a handset speech mode or a hand-free speech mode; and
control means for controlling a variable level of said first level varying means and said second level varying means according to the speech mode set by said speech-mode setting means; and wherein a sending and receiving speech path including said hand-held radiotelephone and said base station is provided with an echo canceler for canceling an echo signal corresponding to an acoustic echo generated at least between the speaker and the microphone of said hand-held radiotelephone.

16. A radiotelephone system according to claim 15, wherein said echo canceler is provided in said base station.

17. A radiotelephone system according to claim 15, wherein said hand-held radiotelephone further comprises an echo canceler control for rendering said echo canceler operative when the hand-free speech-mode is set and rendering said echo canceler inoperation when the handset speech mode is set.

18. A hand-held radiotelephone connected to a base station via a radio channel, comprising:
a microphone for producing a speech signal corresponding to a user's utterance;
first level varying means, connected to said microphone, for varying the level of the speech signal from the microphone to produce a level-varied speech signal;
modulating and transmitting means, connected to said first level varying means, for modulating a carrier signal according to the level-varied speech signal and transmitting the modulated carrier signal via said radio channel to said base station; receiving and demodulating means for receiving a carrier signal from said base station via said radio channel and demodulating the received carrier signal into a received speech signal;
second level varying means connected to said receiving and demodulating means, for varying the level of the received speech signal to produce a level-varied received speech signal;
a speaker, connected to said second level varying means, for producing a voice signal corresponding to the level-varied received speech signal;
speech-mode setting means for setting a speech mode to either a handset speech mode or a hand-free speech mode;
switching means for selectively switching between at least a first state and a second state;
space-mode setting means for setting a using space mode to either a first space mode corresponding to a space in a car when said switching means is in the first state or a second space mode corresponding to a space larger than the space in a car when said switching means is in the second state; and
control means for controlling a variable level of said first level varying means and said second level varying means according to the speech mode set by said speech-mode setting means and the using space mode set by said space-mode setting means.

19. A radiotelephone according to claim 18, wherein said control means comprises gain setting means for:
setting a gain of each of said first level varying means and said second level varying means to a first value when the handset speech mode is set by said speech-mode setting means;
setting the gain of each of said first level varying means and said second level varying means to a second value larger than said first value when the hand-free speech mode is set by said speech-mode setting means and the second space mode is set by said space-mode setting means; and
setting the gain of each of said first level varying means and said second level varying means to a third value larger than said first value but smaller than said second value when the hand-free speech mode is set by said speech mode setting means and the first space mode is set by said space-mode setting means 20. A radiotelephone according to claim 18 or 19, wherein said speech-mode setting means includes a manual speech-mode designation switch selectable between at least first and second states, and the handset speech mode is set when the manual speech-mode designation switch is in the first state and the hand-free speech mode is set when the manual speech-mode designation switch is in the second state and, wherein said switching means includes a manual space-mode designation switch.

21. A radiotelephone according to claim 18 or 19, wherein said switching means includes a manual mode designation switch with three changeover positions and the handset speech-mode is set when the mode designation switch is placed in a first changeover position; the hand-free speech mode and the first space mode are set when the manual mode designation switch is placed in a second changeover position; and the hand-free speech mode and the second space mode are set when the manual mode designation switch is placed in a third changeover position.

22. A hand-held radiotelephone apparatus connected to a base station via a radio channel comprising:
a radiotelephone; and
a fixing member for detachably fixing said radiotelephone in a car to enable hand-free talking; wherein said radiotelephone comprises:
a microphone for producing a speech signal corresponding to a user's utterance;
first level varying means, connected to said microphone, for varying the level of the speech signal from the microphone to produce a level-varied speech signal;
modulating and transmitting means, connected to said first level varying means, for modulating a carrier signal according to the level-varied speech signal and transmitting the modulated carrier signal via said radio channel to said base station,
receiving and demodulating means for receiving a carrier signal from said base station via said radio channel and demodulating the received carrier signal into a received speech signal;
second level varying means connected to said receiving and demodulating means, for varying the level of the received speech signal to produce a level-varied received speech signal;
a speaker, connected to said second level varying means, for producing a voice signal corresponding to the level-varied received speech signal;
speech-mode setting means for setting a speech mode to either a handset speech mode or a hand-free speech mode;
judging means for judging whether or not said radiotelephone is fixed by said fixing member;
space-mode setting means for setting a using space mode to a first space mode corresponding to a space in a car when the judging means has judged that the radiotelephone is fixed by said fixing member and setting the using space mode to a second space mode corresponding to, a space larger than the space in a car when said judging means has judged that said radiotelephone is not fixed by said fixing member; and control means for controlling a variable level of said first level varying means and said second level varying means according to the speech mode set by said speech-mode setting means and the using space mode set by said space-mode setting means.

23. A radiotelephone apparatus according to claim 22, wherein said radiotelephone further comprises:

identifying means for identifying a first state in which said radiotelephone is fixed to said fixing member, a second state in which said radiotelephone is not fixed to said fixing member but put on a surface, and a third state in which said radiotelephone is neither fixed to said fixing member nor put on the surface, and wherein said speech-mode setting means sets the handset speech mode when the identifying means identifies that the radiotelephone is in said third state; sets the hand-free speech mode and said using space-mode setting means sets the second using space mode when the identifying means identifies that the radiotelephone is in said second state; and sets the hand-free speech mode and said using space-mode setting means sets the first using space mode when the identifying means has determined that the radiotelephone is in said first state.

24. A radiotelephone system comprising:

a base station connected to a communication network via a wire channel; and a hand-held radiotelephone apparatus connected to said base station via a radio channel; wherein said hand-held radiotelephone apparatus comprises a radiotelephone and a fixing member for detachably fixing the radiotelephone in a car to enable hand-free talking, said radiotelephone comprising:

a microphone for producing a speech signal corresponding to a user's utterance;

first level varying means, connected to said microphone, for varying the level of the speech signal to produce a level-varied speech signal;

modulating and transmitting means, connected to said first level varying means, for modulating a carrier signal according to the level-varied speech signal and transmitting the modulated carrier signal via said radio channel to said base station;

receiving and demodulating means for receiving a carrier signal from said base station via said radio channel and demodulating the received carrier signal into a received speech signal;

second level varying means, connected to said receiving and demodulating means, for varying the level of the received speech signal to produce a level-varied received speech signal;

a speaker, connected to said second level varying means, for producing a voice signal corresponding to the level-varied received speech signal;

speech-mode setting means for setting a speech mode to either a handset speech mode or a hand-free speech mode;

judging means for judging whether or not said radiotelephone is fixed by said fixing member;

space-mode setting means for setting a using space mode to a first space mode corresponding to a space in a car when the judging means has judged that the radiotelephone is fixed by said fixing member, and setting the using space mode to a second space mode corresponding to a space larger than the space in a car when said judging means has judged that said radiotelephone is not fixed by said fixing member; and control means for controlling a variable level of said first level varying means and second level varying means according to the speech mode set by said speech-mode setting means and the using space mode set by said space-mode setting means; and wherein a sending and receiving speech path including said hand-held radiotelephone apparatus and said base station is provided with an echo canceler for canceling an echo signal corresponding to an acoustic echo generated at least between the speaker and microphone of said hand-held radiotelephone.

25. A radiotelephone system according to claim 24, wherein said echo canceler is provided in said base station.

26. A radiotelephone system according to claim 24, wherein said radiotelephone further comprises an echo canceler control for rendering said echo canceler operative when the hand-free speech mode is set and rendering said echo canceler inoperative when the handset speech mode is set.

27. A radiotelephone system comprising:

a base station connected to a communication network via a wire channel;

a hand-held radiotelephone connected to said base station via a radio channel, said hand-held radiotelephone comprising:

a microphone for producing a speech signal corresponding to a user's utterance;

first level varying means, connected to said microphone, for varying the level of the speech signal from the microphone to produce a level-varied speech signal;

modulating and transmitting means connected to said first level varying means, for modulating a carrier signal according to the level-varied speech signal and transmitting the modulated carrier signal via said radio channel to said base station;

receiving and demodulating means for receiving a carrier signal from said base station via said radio channel and demodulating the received carrier signal into a received speech signal;

second level varying means, connected to said receiving and demodulating means, for varying the level of the received speech signal to produce a level-varied received speech signal;

a speaker, connected to said second level varying means, for producing a voice signal corresponding to the level-varied received speech signal;

speech-mode setting means for setting a speech-mode to either a handset speech mode or a hand-free speech mode; and control means for controlling a variable level of said first level varying means and said second level varying means according to the speech mode set by said speech-mode setting means; and an echo canceler, provided in at least one of said hand-held radiotelephone and said base station, for canceling an echo signal corresponding to an acoustic echo generated at least between the speaker and the microphone of said hand-held radiotelephone.

28. A radiotelephone system according to claim 27, wherein said echo canceler is provided in said base unit.

29. A radiotelephone system according to claim 28, wherein said hand-held radiotelephone further comprises an echo canceler controller for rendering said echo canceler operative when the hand-free speech mode is set and for rendering said echo canceler inoperative when the handset speech mode is set.

* * * * *